United States Patent
Zheng et al.

(10) Patent No.: US 12,418,048 B2
(45) Date of Patent: Sep. 16, 2025

(54) BATTERY AND ELECTRICITY-CONSUMPTION DEVICE

(71) Applicant: Hithium Tech HK Limited, Kowloon (HK)

(72) Inventors: Jianming Zheng, Guangdong (CN); Yuyu Chen, Guangdong (CN); Tong Yu, Guangdong (CN)

(73) Assignee: HITHIUM TECH HK LIMITED, Kowloon (HK)

( * ) Notice: Subject to any disclaimer, the term of this patent is extended or adjusted under 35 U.S.C. 154(b) by 0 days.

(21) Appl. No.: 19/039,667

(22) Filed: Jan. 28, 2025

(65) Prior Publication Data
US 2025/0253398 A1    Aug. 7, 2025

(30) Foreign Application Priority Data

Feb. 2, 2024  (CN) .................. 202410147200.3

(51) Int. Cl.
| | |
|---|---|
| *H01M 10/0567* | (2010.01) |
| *H01M 4/36* | (2006.01) |
| *H01M 4/525* | (2010.01) |
| *H01M 4/62* | (2006.01) |
| *H01M 10/0587* | (2010.01) |
| *H01M 4/02* | (2006.01) |

(52) U.S. Cl.
CPC ....... *H01M 10/0567* (2013.01); *H01M 4/366* (2013.01); *H01M 4/525* (2013.01); *H01M 4/628* (2013.01); *H01M 10/0587* (2013.01); *H01M 2004/028* (2013.01); *H01M 2300/0025* (2013.01)

(58) Field of Classification Search
None
See application file for complete search history.

(56) References Cited

U.S. PATENT DOCUMENTS

2015/0364795 A1   12/2015   Stefan et al.

FOREIGN PATENT DOCUMENTS

| CN | 1495959 A | 5/2004 |
|---|---|---|
| CN | 109119686 A | 1/2019 |
| CN | 111430723 A | 7/2020 |
| CN | 114497773 A | 5/2022 |
| CN | 114725392 A | 7/2022 |
| CN | 116404257 A | 7/2023 |
| CN | 116547838 A | 8/2023 |
| CN | 116581404 A | 8/2023 |
| CN | 116598572 A | 8/2023 |
| CN | 117083745 A | 11/2023 |
| JP | 2005203341 A | 7/2005 |

OTHER PUBLICATIONS

Hai, Ming et al., "Applications of pre-lithiation technologies in energy storage," Energy Storage Science and Technology, 2017, 6(2): 223-236.
CNIPA, First Office Action for corresponding Chinese Patent Application No. 202410147200.3, Mar. 19, 2024, 20 pages.
CNIPA, Notice of Granting a Patent Right for Invention for corresponding Chinese Patent Application No. 202410147200.3, Apr. 1, 2024, 11 pages.

*Primary Examiner* — Carlos Barcena
(74) *Attorney, Agent, or Firm* — Hodgson Russ LLP

(57) ABSTRACT

A battery includes a negative electrode, a separator, a positive electrode, and an electrolyte. The electrolyte includes a first additive with a structural formula (1), where R1 is selected from a group consisting of H, $C_nH_{2n+1}$, and $C_6H_5$, and R2 is selected from a group consisting of H, $C_nH_{2n+1}$, and $C_6H_5$, with n satisfying $1 \leq n \leq 10$. A mass fraction w1 of the first additive in the electrolyte satisfies $0.01\% \leq w1 \leq 2\%$. A mass fraction of lithium supplement particles in a positive active layer of the positive electrode is w3, the lithium supplement particle includes a matrix and a coating layer, a plane shrinkage rate α of the matrix satisfies $0.4 \leq \alpha \times w3/w1 \leq 1.7$. A chemical formula of the matrix is $Li_{1+r}M_{1-p}N_pO_{4-s}B_s$, with r satisfying $0.1 < r < 6.1$, p satisfying $0 \leq p < 0.99$, and s satisfying $0 \leq s < 0.1$.

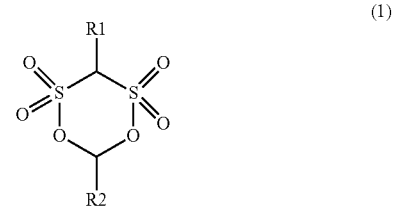

(1)

18 Claims, 4 Drawing Sheets

BATTERY AND ELECTRICITY-CONSUMPTION DEVICE

CROSS-REFERENCE TO RELATED APPLICATIONS

This application claims priority under 35 U.S.C. § 119(a) to Chinese Patent Application No. 202410147200.3, filed Feb. 2, 2024, the entire disclosure of which is incorporated herein by reference.

TECHNICAL FIELD

The present disclosure relates to the field of battery technology, and in particular, to a battery and an electricity-consumption device.

BACKGROUND

With the rapid development of the current new energy technologies, the demand for cycling life of the battery is becoming increasingly high. A small amount of lithium iron oxide as a lithium supplement agent added to a positive electrode material can effectively compensate the consumption of active lithium during the cycling process, thereby improving the cycling performance of the battery.

SUMMARY

The disclosure provides a battery. The battery includes a negative electrode, a separator, a positive electrode, and an electrolyte. The separator is disposed on one side of the negative electrode. The positive electrode is disposed on one side of the separator facing away from the negative electrode. The positive electrode includes a positive active layer and a positive current collector layer, the positive active layer is disposed on a surface of the positive current collector layer, and the positive active layer includes multiple lithium supplement particles. At least part of the positive electrode and at least part of the negative electrode are immersed in the electrolyte, and the electrolyte further includes a first additive and a lithium salt. A structural formula of the first additive is

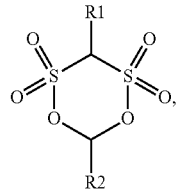

wherein R1 is selected from a group consisting of H, $C_nH_{2n+1}$, and $C_6H_5$, and R2 is selected from a group consisting of H, $C_nH_{2n+1}$, and $C_6H_5$, with n satisfying $1 \leq n \leq 10$; and a mass fraction w1 of the first additive in the electrolyte satisfies $0.01\% \leq w1 \leq 2\%$. A mass fraction of the lithium supplement particles in the positive active layer is w3, the lithium supplement particle comprises a matrix and a coating layer, the coating layer is disposed on an outer surface of the matrix, a plane shrinkage rate α of the matrix satisfies $0.4 \leq \alpha \times w3/w1 \leq 1.7$; wherein a chemical formula of the matrix is $Li_{1+r}M_{1-p}N_pO_{4-s}B_s$, with r satisfying $0.1 < r < 6.1$, p satisfying $0 \leq p < 0.99$, and s satisfying $0 \leq s < 0.1$; wherein M and N each are selected from a group consisting of iron, cobalt, nickel, titanium, zinc, magnesium, aluminum, manganese, vanadium, chromium, zirconium, copper, niobium, tantalum, tungsten, yttrium, lanthanum, and any combination thereof, and B is selected from a group consisting of sulfur, nitrogen, fluorine, chlorine, bromine, and any combination thereof.

The disclosure further provides an electricity-consumption device. The electricity-consumption device includes a device body and the battery provided in the disclosure. The battery is configured to supply power to the device body.

BRIEF DESCRIPTION OF THE DRAWINGS

In order to describe technical solutions of embodiments of the disclosure more clearly, the following will give a brief introduction to the accompanying drawings used for describing the embodiments. Apparently, the accompanying drawings hereinafter described are some embodiments of the present disclosure. Based on these drawings, those of ordinary skill in the art can also obtain other drawings without creative effort.

DESCRIPTION OF REFERENCE SIGNS

Figure 1:
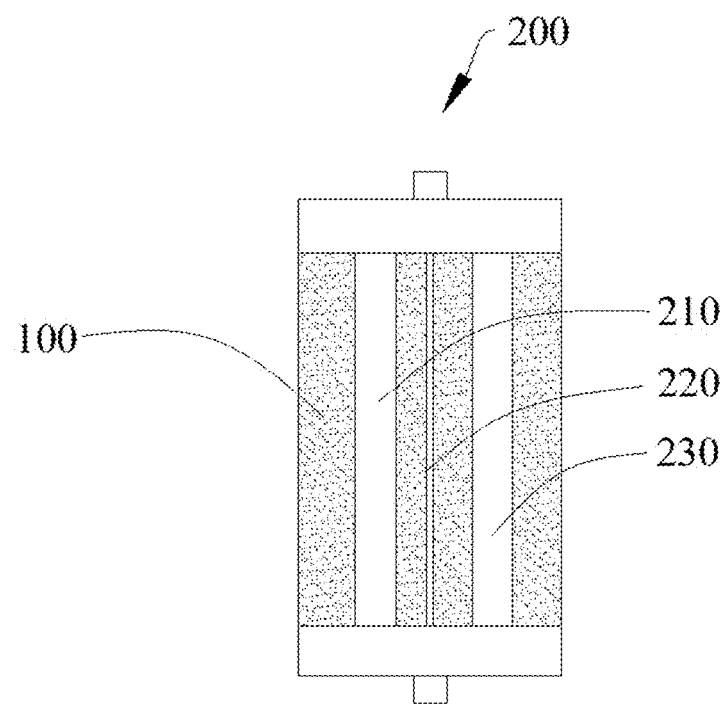
FIG. 1 is a schematic cross-sectional structural view of a battery provided in an embodiment of the disclosure.

100—electrolyte, 200—battery, 210—negative electrode, 220—separator, 230—positive electrode, 231—positive active layer, 232—positive current collector layer, 300—electricity-consumption device, 310—device body, 400—lithium supplement particle, 410—coating layer, 420—matrix.

DETAILED DESCRIPTION

The following will illustrate technical solutions of embodiments of the disclosure with reference to the accompanying drawings of embodiments of the disclosure. Apparently, embodiments described herein are merely some embodiments, rather than all embodiments, of the disclosure. Based on the embodiments of the disclosure, all other embodiments obtained by those of ordinary skill in the art without creative effort shall fall within the protection scope of the disclosure.

The terms "first", "second", and the like used in the specification, the claims, and the accompanying drawings of the present disclosure are used to distinguish different objects rather than describe a particular order. In addition, the terms "include" and "comprise", as well as variations thereof are intended to cover non-exclusive inclusion. For example, a process, method, system, product, or apparatus including a series of steps or units is not limited to the listed steps or units. Instead, it can optionally include other steps or units that are not listed; alternatively, other steps or units inherent to the process, method, product, or device can be also included either.

The term "embodiment" or "implementation" referred to herein means that a particular feature, structure, or character described in conjunction with the embodiment or implementation may be contained in at least one embodiment of the present disclosure. The phrase appearing in various places in the specification does not necessarily refer to the same embodiment, nor does it refer to an independent or alternative embodiment that is mutually exclusive with other embodiments. It is explicitly and implicitly understood by those of ordinary skill in the art that embodiments described in the present disclosure may be combined with other embodiments.

With the rapid development of the current new energy technologies, the demand for cycling life of the battery is becoming increasingly high. A small amount of lithium iron oxide as a lithium supplement agent added to a positive electrode material can effectively compensate the consumption of active lithium during the cycling process, thereby improving the cycling performance of the battery. However, for the lithium iron oxide, an oxidation reaction between iron and oxygen occurs during delithiation, making it easy to produce oxygen, which causes an electrolyte to be oxidized at a positive electrode. This not only consumes the electrolyte but also makes the electrolyte system unstable, thereby reducing the cycling life and the safety performance of the battery. When the lithium iron oxide releases a large amount of lithium ions during delithiation, the lithium iron oxide also releases a large amount of oxygen, causing more side reactions between the positive electrode material and the electrolyte, thereby reducing the safety performance of the battery. When the lithium iron oxide releases a small amount of lithium ions during delithiation, it is difficult for the lithium iron oxide to compensate the consumption of active lithium during the cycling process, thereby reducing the cycling performance of the battery.

Figure 2:
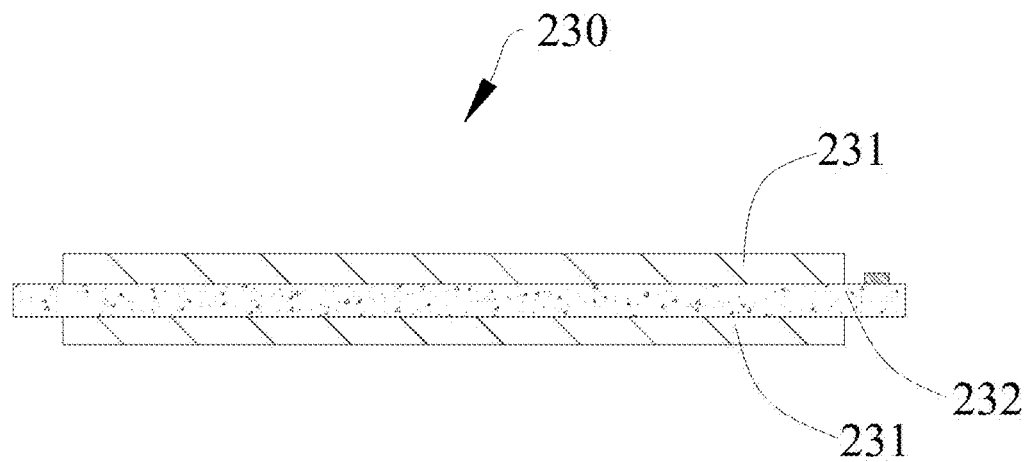
FIG. 2 is a schematic cross-sectional structural view of a positive electrode provided in an embodiment of the disclosure.

Reference is made to FIG. 1 and FIG. 2. Embodiments of the disclosure provide an electrolyte 100, and the electrolyte 100 includes a first additive, where the first additive includes a cyclic compound containing two sulfonate groups. A mass fraction w1 of the first additive in the electrolyte 100 satisfies 0.01%≤w1≤2%.

Specifically, the mass fraction w1 of the first additive may be, but is not limited to, 0.01%, 0.05%, 0.1%, 0.15%, 0.2%, 0.25%, 0.3%, 0.35%, 0.45%, 0.55%, 0.65%, 0.7%, 0.85%, 0.9%, 1%, 1.15%, 1.2%, 1.25%, 1.3%, 1.45%, 1.55%, 1.65%, 1.75%, 1.8%, 1.85%, 1.9%, 1.95%, 2%, etc.

It may be understood that, the mass fraction w1 of the first additive is a ratio of the mass of the first additive to the mass of the electrolyte 100.

It may be understood that, the electrolyte 100 is applied to a battery 200. The battery 200 is a lithium ion battery, and the electrolyte 100 includes a lithium salt. The battery 200 further includes a negative electrode 210, a separator 220, and a positive electrode 230. The positive electrode 230 includes a positive active layer 231 and a positive current collector layer 232. The positive active layer 231 is disposed on a surface of the positive current collector layer 232, and the positive active layer 231 includes lithium supplement particles 400. At least part of the positive electrode 230 and at least part of the negative electrode 210 are immersed in the electrolyte 100. During the charge-discharge process of the battery 200, the electrolyte 100 serves as a transport medium for active ions, that is, a transport medium for lithium ions. On one hand, the electrolyte 100 can provide some active lithium ions as conductive ions for use. On the other hand, the electrolyte 100 can provide ion channels to help lithium ions move freely in the battery 200. The lithium supplement particles 400 release lithium ions when the battery 200 is charged, so as to timely replenish the active ions consumed in the electrolyte 100.

It may be understood that, the first additive includes the cyclic compound containing two sulfonate groups, and sulfur atoms in the sulfonate groups have a high electron affinity, which can attract electrons and increase the electron cloud density around the sulfur atoms. The sulfur atoms also have a high electronegativity, making it easier for the sulfonate groups to accept electrons, so that the sulfonate groups have a higher reduction potential. That is, the first additive has a strong reduction ability. Furthermore, the bond energy of the sulfur-oxygen bond in the sulfonate groups is relatively low, so that the sulfur-oxygen bond is more prone to breakage during oxidation reaction, resulting in a lower oxidation potential of the sulfonate groups. Furthermore, the first additive is a cyclic compound, and the cyclic structure has a poorer stability compared with the linear structure, which makes the first additive more prone to redox reaction compared with other components in the electrolyte 100.

When the electrolyte 100 is applied to the battery 200 and the battery 200 is charged, the potential of the positive electrode 230 continuously rises and the potential of the negative electrode 210 continuously decreases. Therefore, the oxidation potential of the first additive is relatively low, and in the electrolyte 100 near the positive electrode 230, the first additive is easier to reach the oxidation potential than other components, which makes the first additive more prone to oxidation reaction compared with other components. The reduction potential of the first additive is relatively high, and in the electrolyte 100 near the negative electrode 210, the first additive is easier to reach the reduction potential than other components, which makes the first additive more prone to reduction reaction compared with other components. Furthermore, the first additive is a cyclic compound, and the cyclic structure has a poorer stability compared with the linear structure, which makes the first additive more prone to redox reaction compared with other components in the electrolyte 100. In conclusion, in the electrolyte 100, the first additive is more prone to oxidation reaction and reduction reaction compared with other components.

In the embodiment, when the electrolyte 100 is applied to the battery 200 and the positive electrode 230 of the battery 200 includes lithium supplement particles 400, the lithium supplement particles 400 release lithium ions to compensate the continuous consumption of lithium ions during the initial charge-discharge cycle and the cycling process of the battery 200, which enables the battery 200 to maintain a higher level of usable energy. However, the lithium supplement particles 400 release negative oxygen ions while releasing lithium ions, and the negative oxygen ions have a strong oxidizing power. Therefore, side reactions between the negative oxygen ions and the electrolyte 100 occur easily, which reduces the stability of the electrolyte 100. However, in the disclosure, the electrolyte 100 includes the first additive, and the first additive includes a cyclic compound containing two sulfonate groups. Sulfur atoms in the sulfonate groups have a high electron affinity and a high electronegativity, the bond energy of the sulfur-oxygen bond is low, and the cyclic structure is less stable and has a higher reactivity compared with a linear structure, which gives the first additive a higher reduction potential and a lower oxidation potential. When the battery 200 is charged, the potential of the positive electrode 230 rises while the potential of the negative electrode 210 decreases, and the first additive near the positive electrode 230 reaches the oxidation potential before other substances. In this case, oxidative decomposition of the first additive occurs and the generated products adhere to the surface of the lithium supplement particles 400, thereby suppressing side reactions between the negative oxygen ions or oxygen released by the lithium supplement particles 400 and the electrolyte 100, which is beneficial for maintaining the stability of the electrolyte 100. Similarly, the first additive near the negative electrode 210 reaches the reduction potential before other substances. In this case, reduction decomposition of the first additive occurs and the generated products form a film on the surface of the negative electrode 210, which strengthens the interfacial film between the negative electrode 210 and the electrolyte 100, thereby improving the capacity retention rate of the battery 200 when the electrolyte 100 is applied to the battery 200. In addition, the reaction products of the first additive are mainly sulfate compounds, which do not generate excessive gas, thereby further improving the safety performance of the battery 200 when the electrolyte 100 is applied to the battery 200.

When the mass fraction w1 of the first additive satisfies 0.01%≤w1≤2%, that is, the mass fraction of the first additive is within a reasonable range, the first additive is more prone to redox reaction compared with other substances in the electrolyte 100. The generated products of the first additive form a film on the surfaces of the lithium supplement particles 400, thereby effectively preventing side reactions between oxygen released by the lithium supplement particles 400 and the electrolyte 100. In addition, a film is formed on the surface of the negative electrode 210 to strengthen the interfacial film between the negative electrode 210 and the electrolyte 100, and the first additive is prevented from generating excessive acids, so that the interfacial film between the positive electrode 230 and/or the negative electrode 210 and the electrolyte 100 will not be affected. In this way, the battery 200 has a high energy efficiency, safety performance, and capacity retention rate when the electrolyte 100 is applied to the battery 200. The products of redox reaction of the first additive include acids, and when the mass fraction w1 of the first additive is too large, excessive acids generated by the first additive may damage the interfacial film between the positive electrode 230 and/or the negative electrode 210 and the electrolyte 100. In this way, the stability of the interfacial film between the positive electrode 230 and/or the negative electrode 210 and the electrolyte 100 is reduced, and the internal resistance of the battery 200 is increased, thereby reducing the charge-discharge efficiency, the energy efficiency, and the safety performance of the battery 200 when the electrolyte 100 is applied to the battery 200. When the mass fraction w1 of the first additive is too small, the generated products of oxidative decomposition and reductive decomposition of the first additive form a film with a relatively small area, making it difficult for the first additive to suppress side reactions between oxygen released by the lithium supplement particles 400 and the electrolyte 100, thereby reducing the stability of the electrolyte 100 and the capacity retention rate of the battery 200 when the electrolyte 100 is applied to the battery 200.

In some embodiments, the structural formula of the first additive is

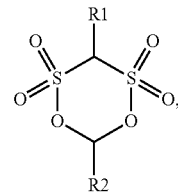

where R1 is selected from a group consisting of H, C, $C_nH_{2n+2}$, and $C_6H_6$, and R2 is selected from a group consisting of H, C, $C_nH_{2n+2}$, and $C_6H_6$, with n satisfying $1 \le n \le 10$.

The value of n may be selected from a group consisting of 1, 2, 3, 4, 5, 6, 7, 8, 9, and 10.

In the embodiment, according to the structural formula of the first additive, the first additive includes the cyclic compound containing two sulfonate groups. The first additive has a relatively poor structural stability due to the cyclic structure, so that the first additive is more prone to reactions compared with other components in the electrolyte 100. When the electrolyte 100 includes the first additive and the first additive is applied to the battery 200, the electron cloud density around the sulfur atoms is relatively high due to a high electron affinity and a high electronegativity of the sulfur atoms in the two sulfonate groups, so that the first additive has a higher reduction potential. The two sulfonate groups have multiple sulfur-oxygen bonds, and the bond energy of the sulfur-oxygen bond is relatively low, resulting in a lower oxidation potential of the first additive. When the electrolyte 100 is applied to the battery 200 and the battery 200 is charged, the potential of the positive electrode 230 continuously rises and the potential of the negative electrode 210 continuously decreases. Therefore, the oxidation potential of the first additive is relatively low. In the electrolyte 100 near the positive electrode 230, as the potential of the positive electrode 230 rises, the first additive is more prone to oxidative decomposition compared with other components. The reduction potential of the first additive is relatively high. In the electrolyte 100 near the negative electrode 210, as the potential of the negative electrode 210 decreases, the first additive is more prone to reductive decomposition compared with other components. The decomposition products of oxidation reaction of the first additive adhere to the surfaces of the lithium supplement particles 400 and form a film on the surfaces of the lithium supplement particles 400, thereby preventing reactions between oxygen generated by the lithium supplement particles 400 and the electrolyte 100, which is beneficial for maintaining the stability of the electrolyte 100. Similarly, the decomposition products of reduction reaction of the first additive form a film on the surface of the negative electrode 210 to strengthen the interfacial film between the negative electrode 210 and the electrolyte 100, thereby improving the cycling performance and the capacity retention rate of the battery 200 when the electrolyte 100 is applied to the battery 200. R1 and R2 are each selected from a group consisting of H, C, a straight-chain alkane with 1 to 10 atoms, and a benzene ring, so as to avoid reducing the reduction potential of the first additive or increasing the oxidation potential of the first additive.

In some embodiments, the electrolyte 100 further includes a second additive. The second additive is a film-forming additive. The reduction potential of the first additive is higher than the reduction potential of the second additive, the oxidation potential of the first additive is lower than the oxidation potential of the second additive, and a mass fraction w2 of the second additive in the electrolyte satisfies $2 \leq w2/w1 \leq 10$.

Specifically, the value of w2/w1 may be, but is not limited to 2, 2.3, 2.5, 2.8, 3, 3.2, 3.8, 4, 4.2, 4.5, 4.8, 5, 5.2, 5.6, 5.9, 6, 6.2, 6.5, 6.8, 7, 7.5, 7.8, 8, 8.3, 8.8, 8.9, 9, 9.3, 9.5, 9.8, 10, etc.

In the embodiment, the electrolyte 100 further includes the second additive and the second additive is a film-forming additive. When the electrolyte 100 is applied to the battery 200, the second additive facilitates the formation of the interfacial film between the positive electrode 230 and/or the negative electrode 210 and the electrolyte 100, and maintains the stability of the interfacial film between the positive electrode 230 and/or the negative electrode 210 and the electrolyte 100. In this way, when the electrolyte 100 is applied to the battery 200, the increasing of the internal resistance of the battery 200 due to the damage of the interfacial film is prevented, so that the battery 200 has a high energy efficiency when the electrolyte 100 is applied to the battery 200. Further, the reduction potential of the first additive is higher than the reduction potential of the second additive, and the oxidation potential of the first additive is lower than the oxidation potential of the second additive. When the electrolyte 100 is applied to the battery 200 and the battery 200 is charged, the potential of the positive electrode 230 continuously rises, and the first additive reaches the oxidation potential faster than the second additive, making the first additive more prone to oxidation reaction compared with the second additive. Also, the potential of the negative electrode 210 continuously decreases, and the first additive reaches the reduction potential faster than the second additive, making the first additive more prone to reduction reaction compared with the second additive. As such, the second additive can be prevented from being decomposed and not functioning normally, so that the second additive can facilitate the formation of the interfacial film between the positive electrode 230 and/or the negative electrode 210 and the electrolyte 100, and can maintain the stability of the interfacial film between the positive electrode 230 and/or the negative electrode 210 and the electrolyte 100.

When the electrolyte 100 satisfies $2 \leq w2/w1 \leq 10$, the mass fraction of the first additive and the mass fraction of the second additive are both within a reasonable range. In this case, the first additive can produce enough decomposition products to cover the surfaces of the lithium supplement particles 400 and slow down the reaction between oxygen generated by the lithium supplement particles 400 and the electrolyte 100. Also, a film is formed on the surface of the negative electrode 210 to strengthen the interfacial film between the negative electrode 210 and the electrolyte 100. In addition, excessive acids generated by the first additive due to excessive first additive are prevented, and the waste of the second additive caused by the consumption of the second additive due to insufficient first additive is also prevented. In this way, the interfacial film between the positive electrode 230 and/or the negative electrode 210 and the electrolyte 100 has a good stability, and the electrolyte 100 has a good stability, so that the battery 200 has a high charge-discharge efficiency, energy efficiency, and safety performance. When the value of w2/w1 is too large, the mass fraction of the first additive is much smaller than the mass fraction of the second additive. On one hand, the mass fraction of the first additive is too small, and the decomposition products of the first additive are insufficient, which is difficult to form a film on the surfaces of the lithium supplement particles 400 or the surface of the negative electrode 210, which makes it difficult to slow down side reactions between oxygen generated by the lithium supplement particles 400 and the electrolyte 100. Further, it is difficult to strengthen the interfacial film between the negative electrode 210 and the electrolyte 100. In this case, the electrolyte 100 has a poor stability, and the capacity retention rate of the battery 200 is low. On the other hand, the mass fraction of the second additive is too large, when the battery 200 is charged, the first additive is more prone to oxidative decomposition and reductive decomposition. After the first additive is consumed, oxidative decomposition and reductive decomposition of some portions of the second additive occur to generate gas, resulting in a waste of the second additive. The gas generated by the second additive is not conducive to the cycling of the battery 200, which may accelerate side reactions between the positive electrode 230 and/or the negative electrode 210 and the electrolyte 100 and reduce the stability of the electrolyte 100. In this case, the internal resistance of the battery 200 is increased, which makes the capacity retention rate and the energy efficiency of the battery 200 to be relatively low. When the value of w2/w1 is too small, the mass fraction of the first additive is much greater than the mass fraction of the second additive. On one hand, the mass fraction of the first additive is too large, and oxidative decomposition and reductive decomposition of the first additive will generate excessive acids, which may damage the interfacial film between the positive electrode 230 and/or the negative electrode 210 and the electrolyte 100. In this way, the stability of the interfacial film between the positive electrode 230 and/or the negative electrode 210 and the electrolyte 100 is reduced, and the internal resistance of the battery 200 is increased, thereby reducing the charge-discharge efficiency, the energy efficiency, and the safety performance of the battery 200 when the electrolyte 100 is applied to the battery 200. On the other hand, the mass fraction of the second additive is too small, it is difficult for the second additive to facilitate the formation of the interfacial film between the positive electrode 230 and/or the negative electrode 210 and the electrolyte 100, and it is difficult to maintain the stability of the interfacial film between the positive electrode 230 and/or the negative electrode 210 and the electrolyte 100. In this case, the internal resistance of the battery 200 may be increased, thereby reducing the energy efficiency of the battery 200.

In some embodiments, the mass fraction w2 of the second additive satisfies $1\% \leq w2 \leq 4\%$.

Specifically, the value of the mass fraction w2 of the second additive may be, but is not limited to, 1%, 1.2%, 1.4%, 1.6%, 1.8%, 1.9%, 2%, 2.1%, 2.3%, 2.5%, 2.7%, 2.9%, 3%, 3.1%, 3.3%, 3.5%, 3.6%, 3.7%, 3.8%, 3.9%, 4%, etc.

In the embodiment, when the mass fraction w2 of the second additive satisfies $1\% \leq w2 \leq 4\%$, the mass fraction of the second additive is within a reasonable range. In this case, the second additive can facilitate the formation of the interfacial film between the positive electrode 230 and/or the negative electrode 210 and the electrolyte 100, and can maintain the stability of the interfacial film between the positive electrode 230 and/or the negative electrode 210 and the electrolyte 100. Also, the gas generated due to excessive second additive may be prevented. In this way, the safety performance and the cycling performance of the battery 200 are improved when the electrolyte 100 is applied to the battery 200, and the energy efficiency of the battery 200 is also improved. When the mass fraction of the second additive is too large, the first additive is more prone to oxidative decomposition and reductive decomposition when the battery 200 is charged. After the first additive is consumed, oxidative decomposition and reductive decomposition of some portions of the second additive occur to generate gas, resulting in a waste of the second additive. The gas generated by the second additive is not conducive to the cycling of the battery 200, which may accelerate side reactions between the positive electrode 230 and/or the negative electrode 210 and the electrolyte 100, thereby increasing the internal resistance of the battery 200, which makes the energy efficiency of the battery 200 to be relatively low. When the mass fraction of the second additive is too small, it is difficult for the second additive to facilitate the formation of the interfacial film between the positive electrode 230 and/or the negative electrode 210 and the electrolyte 100, and it is difficult to maintain the stability of the interfacial film between the positive electrode 230 and/or the negative electrode 210 and the electrolyte 100. In this case, the internal resistance of the battery 200 may be increased, thereby reducing the energy efficiency of the battery 200.

In some embodiments, the second additive is selected from a group consisting of vinylene carbonate, fluoroethylene carbonate, ethylene sulfate, tris(trimethylsilane)phosphate, 1,3-propanesultone, adiponitrile, butanedinitrile, 1,3,6-hexanetricarbonitrile, and any combination thereof.

The second additive may include at least one of vinylene carbonate, fluoroethylene carbonate, ethylene sulfate, tris(trimethylsilane)phosphate, 1,3-propanesultone, adiponitrile, butanedinitrile, or 1,3,6-hexanetricarbonitrile. It may be understood that, in the disclosure, the term "at least one" may refer to greater than or equal to one, and "at least one" may be one or more.

In the embodiment, when at least one of vinylene carbonate, fluoroethylene carbonate, ethylene sulfate, tris(trimethylsilane)phosphate, 1,3-propanesultone, adiponitrile, butanedinitrile, or 1,3,6-hexanetricarbonitrile is applied to the electrolyte 100, the formation of the interfacial film between the positive electrode 230 and/or the negative electrode 210 and the electrolyte 100 can be facilitated, and the stability of the interfacial film between the positive electrode 230 and/or the negative electrode 210 and the electrolyte 100 can be improved. In this case, the increasing of the internal resistance of the battery 200 due to the damage of the interfacial film is prevented, thereby enabling the battery 200 to have a high capacity retention rate and safety performance when the electrolyte 100 is applied to the battery 200.

Embodiments of the disclosure provide a battery 200, and the battery 200 includes a negative electrode 210, a separator 220, a positive electrode 230, and the electrolyte 100 provided in the disclosure. The separator 220 is disposed on one side of the negative electrode 210. The positive electrode 230 is disposed on one side of the separator 220 facing away from the negative electrode 210, where the positive electrode 230 includes a positive active layer 231 and a positive current collector layer 232. The positive active layer 231 is disposed on a surface of the positive current collector layer 232, and the positive active layer 231 includes multiple lithium supplement particles 400. At least part of the positive electrode 230 and at least part of the negative electrode 210 are immersed in the electrolyte 100.

It may be understood that, the negative electrode 210, the separator 220, and the positive electrode 230 are sequentially disposed.

It may be understood that, in the battery 200, the electrolyte 100 includes a lithium salt. The electrolyte 100 includes active ions, namely lithium ions. At least part of the positive electrode 230 and at least part of the negative electrode 210 are immersed in the electrolyte 100. During the charge-discharge process of the battery 200, the electrolyte 100 serves as a transport medium for active ions, that is, a transport medium for lithium ions. On one hand, the electrolyte 100 can provide some active lithium ions as conductive ions for use. On the other hand, the electrolyte 100 can provide ion channels to help lithium ions move freely in the battery 200.

In the battery 200 provided in the embodiment, the positive active layer 231 of the positive electrode 230 includes lithium supplement particles 400. When the positive electrode 230 is applied to the battery 200 and the battery 200 is charged, the lithium supplement particles 400 release lithium ions. The lithium ions are transported from the positive electrode 230 to the electrolyte 100, and then are transported to the negative electrode 210 to replenish the lithium ions in the battery 200, thereby improving the initial efficiency, the energy density, and the capacity retention rate of the battery 200. Moreover, the battery 200 includes the electrolyte 100 provided in the disclosure, and at least part of the positive electrode 230 and at least part of the negative electrode 210 are immersed in the electrolyte 100. The electrolyte 100 includes a first additive, and the first additive is more prone to redox reaction compared with other components in the electrolyte 100. The products of oxidative decomposition of the first additive adhere to the surfaces of the lithium supplement particles 400 and can slow down side reactions between oxygen generated by the lithium supplement particles 400 and the electrolyte 100. The products of the reductive decomposition of the first additive form a film on the surface of the negative electrode 210, so as to strengthen the interfacial film between the negative electrode 210 and the electrolyte 100, which is beneficial for maintaining the stability of the electrolyte 100 and improving the capacity retention rate of the battery 200. In addition, the reaction products of the first additive are mainly sulfate compounds, which do not generate excessive gas, thereby enabling the battery 200 to have a high capacity retention rate and a good safety performance.

Optionally, the battery 200 may be one of a cylindrical battery, a prismatic battery, or a pouch battery.

Optionally, the material of the separator 220 is selected from at least one of fiberglass, nonwoven fabric, polyethylene, polypropylene, and polyvinylidene difluoride. In some embodiments, the separator 220 is a single-layer film. In other embodiments, the separator 220 is a multi-layer composite film. When the separator 220 is a multi-layer composite film, the materials of each layer may be the same or different.

Optionally, the thickness of the separator 220 ranges from 14 μm to 18 μm. Specifically, the thickness of the separator 220 may be, but is not limited to, 14 μm, 14.5 μm, 15 μm, 15.5 μm, 16 μm, 16.5 μm, 17 μm, 17.5 μm, 18 μm, etc.

Optionally, the positive active layer 231 further includes a positive active material, and the positive active material is selected from at least one of a lithium transition metal oxide and modified materials thereof. In some embodiments, the positive active material is lithium iron phosphate. The modified materials may be obtained by performing doping modification and/or coating modification on the lithium transition metal oxide. Preferably, the lithium transition metal oxide may be, but is not limited to, lithium cobalt oxide, lithium nickel oxide, lithium manganese oxide, lithium nickel manganese oxide, lithium nickel cobalt manganese oxide, and lithium nickel cobalt aluminum oxide.

Optionally, the material of the positive current collector layer 232 is aluminum.

Optionally, the positive active layer 231 further includes a positive binder and a positive conductive agent. In the positive active layer 231, the positive binder is used to bond the components of the positive active layer 231 to enhance the overall performance of the positive electrode 230. The positive conductive agent can improve the conductivity of the positive active layer 231.

Optionally, the positive binder is selected from at least one of polyvinylidene fluoride, polyvinylidene difluoride, polytetrafluoroethylene, etc.

Optionally, the positive conductive agent is selected from at least one of graphite, superconducting carbon, acetylene black, carbon black, Ketjen black, carbon dots, carbon nanotubes, graphene, carbon nanofibers, etc.

Optionally, the negative electrode 210 includes a negative current collector layer (not illustrated in the drawings) and a negative active layer (not illustrated in the drawings). The negative active layer is disposed on the surface of the negative current collector layer, and the negative active layer includes a negative active material. The negative active material is selected from at least one of lithium metal, artificial graphite, natural graphite, graphene, and other composite materials.

Optionally, the negative current collector layer is copper.

Optionally, the negative active layer further includes a negative binder, a negative conductive agent, and a negative thickening agent. The negative binder is used to bond the components of the negative active layer to improve the overall performance of the negative active layer. The negative conductive agent is used to enhance the conductivity of the negative active layer. The thickening agent is used to improve the adhesion of the negative active layer.

Optionally, the negative conductive agent is selected from at least one of acetylene black, conductive carbon black, carbon nanotubes, carbon fibers, graphene, etc.

Optionally, the negative binder includes at least one of asphalt binder, styrene-butadiene rubber (SBR), polyvinylidene fluoride (PVDF), polytetrafluoroethylene (PTFE), polyvinyl alcohol (PVA), polyacrylonitrile (PAN), polyacrylic acid (PAA), polyacrylate, carboxymethyl cellulose (CMC), sodium alginate, etc.

Optionally, the negative thickening agent is selected from at least one of carboxymethyl cellulose sodium (CMC), polyacrylamide (PAM), polymethyl methacrylate (PMA), etc.

Figure 7:
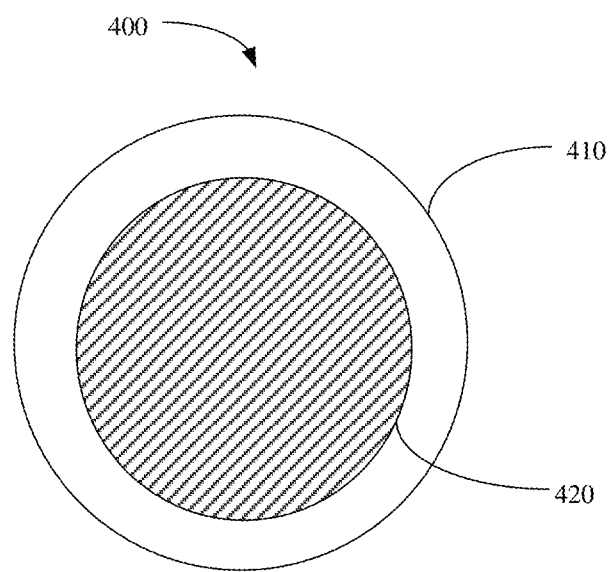
FIG. 7 is a schematic structural view of a lithium supplement particle provided in an embodiment of the disclosure.

In some embodiments, a mass fraction of the lithium supplement particles 400 in the positive active layer 231 is w3. Reference is made to FIG. 7, a lithium supplement particle 400 includes a matrix 420 and a coating layer 410, the coating layer 410 is disposed on an outer surface of the matrix 420, and a plane shrinkage rate α of the matrix 420 satisfies $0.4 \le \alpha \times w3/w1 \le 1.7$. The chemical formula of the matrix 420 is $Li_{1+r}M_{1-p}N_pO_{4-s}B_s$, with r satisfying $0.1<r<6.1$, p satisfying $0 \le p<0.99$, and s satisfying $0 \le s<0.1$. M and N each are selected from a group consisting of iron, cobalt, nickel, titanium, zinc, magnesium, aluminum, manganese, vanadium, chromium, zirconium, copper, niobium, tantalum, tungsten, yttrium, lanthanum, and any combination thereof, and B is selected from a group consisting of sulfur, nitrogen, fluorine, chlorine, bromine, and any combination thereof.

Specifically, the value of α×w3/w1 may be, but is not limited to 0.4, 0.5, 0.6, 0.7, 0.8, 0.9, 1.0, 1.1, 1.2, 1.3, 1.4, 1.5, 1.6, 1.7, etc.

It may be understood that, if a chemical formula of a matrix 420 is $Li_{1+r}M_{1-p}N_pO_{4-s}B_s$, then the matrix 420 is formed by $Li_{1+r}M_{1-p}N_pO_{4-s}B_s$.

Specifically, the value of r may be, but is not limited to, 0.2, 0.4, 0.7, 0.9, 1.0, 1.3, 1.5, 1.7, 2.2, 2.5, 2.8, 3.2, 3.5, 3.7, 4.5, 4.8, 4.9, 5.1, 5.3, 5.5, 5.6, 5.8, 5.9, 6.0, etc.

Specifically, the value of p may be, but is not limited to, 0, 0.05, 0.09, 0.1, 0.15, 0.18, 0.22, 0.25, 0.28, 0.35, 0.39, 0.45, 0.48, 0.55, 0.59, 0.6, 0.65, 0.68, 0.7, 0.75, 0.79, 0.85, 0.88, 0.9, 0.94, 0.99, etc.

Specifically, the value of s may be, but is not limited to, 0, 0.01, 0.02, 0.03, 0.04, 0.05, 0.06, 0.07, 0.08, 0.09, etc.

It may be understood that, the product of the plane shrinkage rate α of the matrix 420 and the mass fraction w3 of the lithium supplement particles 400 represents a total lithium release amount of the multiple lithium supplement particles 400 in the positive active layer 231. A larger value of α×w3 corresponds to a greater total lithium release amount of the multiple lithium supplement particles 400. A smaller value of α×w3 corresponds to a smaller total lithium release amount of the multiple lithium supplement particles 400.

In the embodiment of the disclosure, the lithium supplement particle 400 includes a matrix 420 and a coating layer 410, and the coating layer 410 is disposed on an outer surface of the matrix 420. On one hand, the coating layer 410 covers and protects the matrix 420, thereby preventing the matrix 420 from reacting with the air and being oxidized, and ensuring that the lithium supplement particles 400 can replenish lithium when the battery 200 is charged, which is beneficial for improving the performance of the lithium supplement particles 400. On the other hand, the coating layer 410 has conductive properties. When the active ions in the matrix 420 are deintercalated, the active ions may enter the electrolyte 100 through the coating layer 410, and the coating layer 410 can reduce the impedance when the active ions are deintercalated from the lithium supplement particles 400, which is beneficial for improving the rate performance of the battery 200. In this embodiment, when the battery 200 is charged, the lithium supplement particles 400 can release lithium ions to replenish the lithium ions lost during the initial charge-discharge cycle and the cycling process of the battery 200. The electrolyte 100 includes a first additive, and the first additive is more prone to oxidative decomposition compared with other components in the electrolyte 100 to generate products. The products adhere to the surfaces of the lithium supplement particles 400, so as to reduce the contact between oxygen generated by the lithium supplement particles 400 and the electrolyte 100. The products of the first additive can also form a film on the surface of the negative electrode 210 to enhance the strength of the interfacial film between the negative electrode 210 and the electrolyte 100, thereby slowing down side reactions between the electrolyte 100 and oxygen, which helps maintain the stability of the electrolyte 100 and results in a higher capacity retention rate of the battery 200.

When the value of α×w3/w1 satisfies $0.4 \le \alpha \times w3/w1 \le 1.7$, both the total lithium release amount of the lithium supplement particles 400 and the mass fraction of the first additive are within a reasonable range. On one hand, the total lithium release amount of the lithium supplement particles 400 is within a reasonable range, so that the lithium supplement particles 400 can release lithium ions in time to replenish the lithium ions lost during the charge-discharge cycles of the battery 200, resulting in a higher initial efficiency of the battery 200. On the other hand, compared with other components in the electrolyte 100, the first additive is more prone to oxidative decomposition and reductive decomposition, and the amount of decomposition products is within a reasonable range, which can slow down side reactions between oxygen released by lithium ions and the electrolyte 100. Also, the interfacial film between the positive electrode 230 and/or the negative electrode 210 and the electrolyte 100 may be prevented from being damaged due to excessive acids generated by the first additive. In this way, the battery 200 has a high capacity retention rate, safety performance, and energy efficiency.

When the value of $\alpha \times w3/w1$ is too large, the total lithium release amount of the lithium supplement particles 400 is much greater than the mass fraction of the first additive. If the total lithium release amount of the lithium supplement particles 400 is too large and the mass fraction of the first additive is too small, the lithium ions released by the lithium supplement particles 400 will be excessive, which may lead to lithium-plating on parts of the negative electrode 210. In addition, when the lithium supplement particles 400 release lithium ions, excessive oxygen is released, and the products of oxidative decomposition and reductive decomposition of the first additive are insufficient to prevent side reactions between oxygen released by the lithium ions and the electrolyte 100. Therefore, the stability of the electrolyte 100 is poor, resulting in a lower capacity retention rate of the battery 200. When the value of $\alpha \times w3/w1$ is too small, the total lithium release amount of the lithium supplement particles 400 is much smaller than the mass fraction of the first additive. On one hand, when the total lithium release amount of the lithium supplement particles 400 is too small, the lithium ions released by the particles are insufficient, making it difficult for the lithium supplement particles 400 to replenish the lithium ions lost during the charge-discharge cycles of the battery 200. The lithium supplement particles 400 are less effective in replenishing lithium ions to the battery 200, which reduces the initial efficiency of the battery 200. On the other hand, when the mass fraction of the first additive is too large, the first additive can slow down side reactions between the electrolyte 100 and oxygen generated by the lithium supplement particles 400. However, products of redox reaction of the first additive include acid, and excessive acids may damage the interfacial film between the positive electrode 230 and/or the negative electrode 210 and the electrolyte 100. In this way, the stability of the interfacial film between the positive electrode 230 and/or the negative electrode 210 and the electrolyte 100 is reduced, and the internal resistance of the battery 200 is increased, thereby reducing the charge-discharge efficiency, the energy efficiency, and the safety performance of the battery 200 when the electrolyte 100 is applied to the battery 200.

It may be understood that, an area defined by an inner contour of the coating layer 410 in a cross-section of the positive electrode is S1, and after the lithium supplement particles 400 release lithium ions, an area defined by an outer contour of the matrix 420 is S2, where the plane shrinkage rate $\alpha$ of the matrix 420 satisfies $\alpha=(S1-S2)/S1\times 100\%$.

It may be understood that, the cross-section of the positive electrode 230 is obtained by cutting the positive electrode 230 with an ion-beam cross-section polisher (CP). The positive electrode 230 is cut along the thickness direction (a direction from the positive active layer 231 to the positive current collector layer 232) of the positive electrode 230.

In the embodiment, when the lithium supplement particles 400 release lithium ions, the matrix 420 shrinks due to a decrease in lithium content, while the shape of the coating layer 410 remains the same. Therefore, in the embodiment, the area S1 defined by the inner contour of the coating layer 410 is an area of the matrix 420 before the shrinkage of the matrix 420, and the area S2 defined by the outer contour of the matrix 420 is an area of the matrix 420 after the shrinkage of the matrix 420. S1-S2 is an area of shrinkage of the matrix 420. The plane shrinkage rate of the matrix 420 represents the lithium release amount of each lithium supplement particle 400 during the lithium supplement process.

In some embodiments, the battery 200 satisfies $20 \leq \alpha/w1 \leq 60$.

Specifically, the value of $\alpha/w1$ may be, but is not limited to, 20, 24, 26, 28, 30, 32, 34, 36, 38, 40, 42, 44, 46, 48, 50, 52, 54, 55, 57, 58, 60, etc.

In the embodiment, when the battery 200 satisfies $20 \leq \alpha/w1 \leq 60$, the plane shrinkage rate of the matrix 420 and the mass fraction w1 of the first additive are within a reasonable range. When the battery 200 is charged, the lithium supplement particles 400 release an appropriate amount of lithium ions to replenish the lithium ions lost during the charge-discharge cycles of the battery 200, and oxygen released by the lithium supplement particles 400 is also within a reasonable range. Oxidation reaction of the first additive in the electrolyte 100 firstly occurs, and the generated products adhere to the surfaces of the lithium supplement particles 400 to stop side reactions between the electrolyte 100 and oxygen. The generated products of the first additive also form a film on the surface of the negative electrode 210 to strengthen the interfacial film between the negative electrode 210 and the electrolyte 100, so that the electrolyte 100 has a good stability. When the value of $\alpha/w1$ is too large, the plane shrinkage rate of the matrix 420 is too large, which means that there are excessive lithium ions released by the lithium supplement particles 400, resulting in lithium-plating on parts of the negative electrode 210. Also, oxygen released by the lithium supplement particles 400 is excessive, making it difficult for the first additive to stop side reactions between the electrolyte 100 and oxygen. In this case, the stability of the electrolyte 100 is reduced, thereby reducing the capacity retention rate of the battery 200. When the value of $\alpha/w1$ is too small, the plane shrinkage rate of the matrix 420 is too small or the mass fraction of the first additive is too large, making it difficult for the lithium supplement particles 400 to replenish the lithium ions lost during the charge-discharge process of the battery 200. Further, the first additive may generate excessive acids during redox reaction, and the acids generated by the first additive may damage the interfacial film between the positive electrode 230 and/or the negative electrode 210 and the electrolyte 100. In this way, the stability of the interfacial film between the positive electrode 230 and/or the negative electrode 210 and the electrolyte 100 is reduced, and the internal resistance of the battery 200 is increased, thereby reducing the charge-discharge efficiency, the energy efficiency, and the safety performance of the battery 200 when the electrolyte 100 is applied to the battery 200.

Optionally, in some embodiments, the chemical formula of the matrix 420 is $Li_{1+r}FeO_4$, where r satisfies $3.5<r<4.5$.

Specifically, the value of r may be, but is not limited to, 3.52, 3.54, 3.56, 3.6, 3.62, 3.64, 3.65, 3.68, 3.69, 3.7, 3.72, 3.74, 3.78, 3.8, 3.82, 3.84, 3.86, 3.88, 3.89, 3.9, 4, 4.1, 4.15, 4.2, 4.24, 4.28, 4.3, 4.36, 4.38, 4.4, 4.42, 4.44, 4.45, 4.47, 4.49, 4.5, etc. Optionally, the matrix 420 includes $Li_5FeO_4$.

It may be understood that, the value of r is affected by the preparation process and the synthesis process of the lithium supplement particles 400.

In the embodiment, the matrix 420 includes $Li_rFeO_4$, and thus the matrix 420 has a simple elemental composition, with low material cost and simple synthesis process, which is beneficial for simplifying the preparation process of the positive electrode 230 and saving the preparation cost of the positive electrode 230. In the embodiment, the matrix 420 includes $Li_rFeO_4$, and r satisfies 3.5<r<4.5, resulting in a high lithium content in the matrix 420. When the positive electrode 230 is applied to the battery 200 and the battery 200 is charged, the matrix 420 can release a large amount of lithium ions in time, so as to replenish the lithium ions lost during charge-discharge cycles of the battery 200, thereby improving the initial efficiency and the energy density of the battery 200.

Optionally, the coating layer 410 is a carbon coating layer. The coating layer 410 has conductivity and can protect the matrix 420 that is wrapped by the coating layer 410, so as to enhance the antioxidant performance of the lithium supplement particles 400.

Optionally, the chemical formula of the coating layer 410 is $Z_xO_y@C$, where Z is selected from a group consisting of iron, cobalt, nickel, titanium, zinc, magnesium, aluminum, manganese, vanadium, chromium, zirconium, copper, niobium, tantalum, tungsten, yttrium, and lanthanum, and any combination thereof. The type of Z is the same as the type of M in the matrix 420. The coating layer 410 also satisfies: $1 \leq x \leq 3$, $1 \leq y \leq 5$.

It may be understood that, the chemical formula of the lithium supplement particles 400 is $Li_{1+r}M_{1-p}N_pO_{4-s}B_s@Z_xO_y@C$. The lithium supplement particle 400 is composed of $Li_{1+r}M_{1-p}N_pO_{4-s}B_s$, $Z_xO_y$, and carbon. The lithium supplement particle 400 has $Li_{1+r}M_{1-p}N_pO_{4-s}B_s$ as the core and $Z_xO_y$ is wrapped around the outer surface of the core, where $Z_xO_y$ is an oxide layer that can prevent the core from being oxidized and corroded by the outside environment. Carbon is wrapped around the outer surface of the oxide layer to form a carbon layer, which is used to enhance the conductivity of the coating layer 410. In other words, the coating layer 410 includes the oxide layer and the carbon layer that are sequentially disposed, where the oxide layer is disposed between the carbon layer and the matrix 420.

Specifically, the value of x may be, but is not limited to, 1, 1.2, 1.3, 1.5, 1.7, 1.8, 1.9, 2.0, 2.1, 2.2, 2.4, 2.6, 2.7, 2.8, 2.9, 3, etc.

Specifically, the value of y may be, but is not limited to, 1, 1.2, 1.4, 1.5, 1.6, 1.8, 2.0, 2.2, 2.4, 2.5, 2.7, 2.8, 2.9, 3.0, 3.2, 3.4, 3.6, 3.8, 4.0, 4.1, 4.3, 4.5, 4.6, 4.7, 4.9, 5, etc.

In the embodiment, the chemical formula of the coating layer 410 is $Z_xO_y@C$. The coating layer 410 is composed of an oxide layer and a carbon layer, and the oxide layer is disposed closer to the matrix 420 than the carbon layer. The oxide layer can protect the matrix 420 from being oxidized by oxygen in the air, ensuring that the matrix 420 releases lithium ions for lithium supplement of the battery 200. In addition, the type of Z is the same as the type of M in the matrix 420, which can avoid introducing too many heteroatoms and thus improve the uniformity of the lithium supplement particles 400. Furthermore, the coating layer 410 also includes carbon, and the carbon is wrapped around the outer surface of the oxide layer to form a carbon layer, which is beneficial for improving the conductivity of the lithium supplement particles 400 and reducing the impedance of active ions entering the electrolyte 100 from the matrix 420 and the coating layer 410, and thus improving the energy efficiency of the battery 200.

In some embodiments, the plane shrinkage rate α of the matrix 420 satisfies $5\% \leq \alpha \leq 40\%$.

Specifically, the value of α may be, but is not limited to, 5%, 8%, 9%, 10%, 12%, 14%, 15%, 16%, 18%, 20%, 22%, 24%, 25%, 27%, 29%, 30%, 31%, 34%, 35%, 37%, 38%, 39%, 40%, etc.

In the embodiment, when the plane shrinkage rate α of the matrix 420 satisfies $5\% \leq \alpha \leq 40\%$, the value of the plane shrinkage rate α is within a reasonable range. When the battery 200 is charged, the amount of lithium ions released by the lithium supplement particles 400 is within a reasonable range. In this way, the lithium supplement particles 400 can not only replenish the active ions lost during the charge-discharge cycles of the battery 200, but also avoid reducing the stability of the electrolyte 100 due to excessive oxygen, thereby ensuring that the battery 200 has a high initial efficiency, energy density, and capacity retention rate. When the plane shrinkage rate α of the matrix 420 is too large, the lithium supplement particles 400 release excessive lithium ions when the battery 200 is charged, resulting in lithium-plating on parts of the negative electrode 210. At the same time, excessive release of negative oxygen ions and iron ions may occur, which, upon combining, generate oxygen. In this case, the lithium supplement particles 400 may release excessive oxygen, leading to safety hazards and thus shortening the battery life of the battery 200. Moreover, side reactions between the electrolyte 100 and oxygen will result in a poor stability of the electrolyte 100, and products of these side reactions may increase the internal resistance of the battery 200, thereby reducing the capacity retention rate and the energy efficiency of the battery 200. When the plane shrinkage rate α of the matrix 420 is too small, the lithium supplement particles 400 release insufficient lithium ions when the battery 200 is charged, making it difficult for the lithium supplement particles 400 to replenish the active ions lost during the charge-discharge cycles of the battery 200. In this case, the amount of active ions in the battery 200 continuously reduces, thereby reducing the initial efficiency, the energy efficiency, and the energy density of the battery 200.

Preferably, the plane shrinkage rate α of the matrix 420 satisfies $10\% \leq \alpha \leq 30\%$. Specifically, the value of the plane shrinkage rate α may be, but is not limited to, 10%, 12%, 14%, 15%, 18%, 20%, 21%, 23%, 25%, 26%, 27%, 28%, 30%, etc.

In the embodiment, when the plane shrinkage rate α of the matrix 420 satisfies $10\% \leq \alpha \leq 30\%$, the value of the plane shrinkage rate α is within the preferred range. When the battery 200 is charged, the amount of lithium ions released by the lithium supplement particles 400 is within a reasonable range. In this way, the lithium supplement particles 400 can not only replenish the active ions lost during charge-discharge cycles of the battery 200, but also avoid reducing the stability of the electrolyte 100 due to excessive oxygen, thereby ensuring that the battery 200 has a high initial efficiency, energy density, and capacity retention rate.

Optionally, the plane shrinkage rate α of the matrix 420 may be controlled by controlling the maximum charging voltage of the battery 200 during formation (formation is the initial charge and discharge cycling of a battery after assembly and before the battery is ready for use). A higher maximum charging voltage of the battery 200 during formation corresponds to a larger amount of lithium ions released by the matrix 420, leading to a larger plane shrinkage rate. Conversely, a lower maximum charging voltage of the battery 200 during formation corresponds to a smaller amount of lithium ions released by the matrix 420, leading to a smaller plane shrinkage rate. The maximum charging voltage of the battery 200 during formation is U, where U satisfies 3.85V≤U≤4.2V.

Specifically, the value of U may be, but is not limited to, 3.85V, 3.86V, 3.88V, 3.89V, 3.9V, 3.92V, 3.93V, 3.94V, 3.96V, 3.98V, 3.99V, 4.0V, 4.02V, 4.05V, 4.08V, 4.1V, 4.12V, 4.13V, 4.15V, 4.16V, 4.18V, 4.19V, 4.2V, etc.

It may be understood that in the disclosure, "formation" refers to a process of the first charge of the battery 200, also known as initial charge or molding. During this process, the positive material layer and the negative material layer of the battery 200 are charged and electrochemical reactions occur, which stabilize the chemical reaction system inside the battery 200 and form a solid electrolyte interface (SEI) film, i.e., the interfacial film between the positive electrode 230 and/or the negative electrode 210 and the electrolyte 100, thereby ensuring a good performance of the battery 200 in subsequent use.

In the embodiment, when the maximum charging voltage U of the battery 200 during formation satisfies 3.85V≤U≤4.2V, the maximum charging voltage of the battery 200 during formation is within a reasonable range, which ensures that the plane shrinkage rate of the matrix 420 is within a reasonable range. When the positive electrode 230 is applied to the battery 200 and the battery 200 is charged, the amount of lithium ions released by the matrix 420 is within a reasonable range, so that the lithium ions are intercalated into the negative electrode 210 through the electrolyte 100 to replenish the lithium ions lost due to the formation of the SEI film. In this way, the initial efficiency, the energy density, and the capacity retention rate of the battery 200 are improved, and the cycling life of the battery 200 is extended. When the maximum charging voltage U of the battery 200 during formation is too high, the plane shrinkage rate of the matrix 420 is too large, leading to excessive lithium ion release by the matrix 420 when the positive electrode 230 is applied to the battery 200 and the battery 200 is charged. In this case, when the lithium ions move to the negative electrode 210, quick intercalation of all the lithium ions on the negative electrode cannot be achieved due to the limitation of the negative dynamic performance, and some of the lithium ions are precipitated on the surface of the negative electrode 210, resulting in lithium-plating on the surface of the negative electrode 210. In addition, the matrix 420 releases oxygen while releasing lithium ions, and excessive oxygen released during the process may lead to safety hazards and thus shortening the cycling life of the battery 200 and reducing the safety performance of the battery 200. When the maximum charging voltage U of the battery 200 during formation is too low, the plane shrinkage rate of the matrix 420 is too small. In this case, when the positive electrode 230 is applied to the battery 200 and the battery is charged, the released lithium ions by the matrix 420 are insufficient, thereby reducing the utilization rate of the lithium supplement particles 400. In addition, the lithium ions released by the matrix 420 are insufficient to replenish the lithium ions lost due to the formation of the SEI film, leading to a low initial efficiency, energy density, and capacity retention rate of the battery 200 when the positive electrode 230 is applied to the battery 200, and making it difficult for the lithium supplement particles 400 to replenish lithium ions to the battery 200.

In some embodiments, a mass fraction w3 of the lithium supplement particles 400 in the positive active layer 231 satisfies 0.5%≤w3≤5%.

It may be understood that the mass fraction w3 of the lithium supplement particles 400 in the positive active layer 231 may be a ratio of the mass of the lithium supplement particles 400 to the mass of the positive active layer 231.

Specifically, the value of w3 may be, but is not limited to, 0.5%, 0.6%, 0.7%, 0.9%, 1%, 1.1%, 1.2%, 1.4%, 1.5%, 1.6%, 1.7%, 1.8%, 1.9%, 2%, 2.1%, 2.2%, 2.3%, 2.4%, 2.5%, 2.6%, 2.7%, 2.8%, 2.9%, 3%, 3.2%, 3.4%, 3.5%, 3.7%, 3.9%, 4.0%, 4.1%, 4.3%, 4.5%, 4.6%, 4.7%, 4.9%, 5%, etc.

In the embodiment, when the mass fraction w3 of the lithium supplement particles 400 satisfies 0.5%≤w3≤5%, the mass fraction of the lithium supplement particles 400 is within a reasonable range. When the battery 200 is charged, the amount of lithium ions released by the lithium supplement particles 400 is within a reasonable range. In this way, the lithium supplement particles 400 can not only replenish the active ions lost during the charge-discharge cycles of the battery 200, but also avoid reducing the stability of the electrolyte 100 due to excessive oxygen release, thereby ensuring that the battery 200 has a high initial efficiency, energy density, and capacity retention rate. When the mass fraction w3 of the lithium supplement particles 400 is too large, the mass fraction of the lithium supplement particles 400 in the positive active layer 231 is too large. In this case, when the battery 200 is charged, the lithium supplement particles 400 release excessive lithium ions. At the same time, excessive release of negative oxygen ions and iron ions may occur, which, upon combining, generate oxygen. In this case, the lithium supplement particles 400 may release excessive oxygen, leading to safety hazards and thus shortening the battery life of the battery 200. Moreover, side reactions between the electrolyte 100 and oxygen will result in poor stability of the electrolyte 100, reducing the capacity retention rate of the battery 200. When the mass fraction w3 of the lithium supplement particles 400 is too small, the mass fraction of the lithium supplement particles 400 in the positive active layer 231 is too small. In this case, when the battery 200 is charged, the lithium supplement particles 400 release insufficient lithium ions, making it difficult for the lithium supplement particles 400 to replenish the active ions lost during the charge-discharge cycles of the battery 200, thereby reducing the initial efficiency and energy density of the battery 200.

In some embodiments, under a magnification of 5K and within a rectangular area of 22 μm×15 μm, multiple lithium supplement particles 400 are in a cross-section of the positive electrode 230. A sum of areas defined by inner contours of multiple coating layers 410 is S3, and after the lithium supplement particles 400 release lithium ions, a sum of areas defined by outer contours of multiple matrices 420 is S4, where a shrinkage area S of the multiple lithium supplement particles 400 during the lithium supplement process satisfies S=S3−S4, and S satisfies 1.5 μm²≤S/w1≤8 μm².

Specifically, the value of S/w1 may be, but is not limited to, 1.5 μm², 1.8 μm², 2 μm², 2.2 μm², 2.5 μm², 2.8 μm², 3 μm², 3.2 μm², 3.5 μm², 4 μm², 4.5 μm², 4.8 μm², 5 μm², 5.2 μm², 5.6 μm², 6 μm², 6.5 μm², 7 μm², 7.5 μm², 8 μm², etc.

It may be understood that the rectangular area of 22 μm×15 μm refers to a rectangular area with a length of 22 μm and a width of 15 μm.

In the embodiment, under a specific magnification and in a specific area, a sum of areas S3 defined by inner contours of multiple coating layers 410 is a sum of areas of the matrices 420 of the multiple lithium supplement particles 400 before the shrinkage of the matrices 420, and a sum of areas S4 defined by outer contours of multiple matrices 420 is a sum of areas of the matrices 420 of the multiple lithium supplement particles 400 after the shrinkage of the matrices 420. A difference between S3 and S4 is the shrinkage area S of the multiple lithium supplement particles 400 during the lithium supplement process. When S/w1 satisfies 1.5 $\mu m^2 \leq S/w1 \leq 8$ $\mu m^2$, the value of S/w1 is within a reasonable range, and the amount of lithium ions released by the multiple lithium supplement particles 400 is within a reasonable range, so that the lithium supplement particles 400 can promptly replenish the lithium ions lost during the charge-discharge process of the battery 200, thereby ensuring that the battery 200 has a high initial efficiency, energy density, and capacity retention rate. In addition, the amount of borate-based additive (the first additive) is within a reasonable range, so that the borate-based additive can promptly combine with the negative oxygen ions released by the lithium supplement particles 400 to avoid the generation of excessive oxygen and avoid side reactions between oxygen and the electrolyte 100. It may also prevent excessive borate-based additive from increasing the interfacial impedance between the positive electrode 230/negative electrode 210 and the electrolyte 100. In this way, the battery 200 has a high cycling performance, safety performance, and energy efficiency. When the value of S/w1 is too large, the shrinkage area S of the multiple lithium supplement particles 400 during the lithium supplement process is too large or the mass fraction of the borate-based additive is too small. In this case, the lithium supplement particles 400 release excessive lithium ions when the battery 200 is charged, resulting in lithium-plating on parts of the negative electrode 210, which increases the internal resistance of the battery 200 and reduces the energy efficiency of the battery 200. At the same time, the lithium supplement particles 400 release excessive negative oxygen ions and iron ions, and the borate-based additive only combines with a small portion of negative oxygen ions. In this case, the negative oxygen ions combine with the iron ions to generate more oxygen, leading to safety hazards and thus shortening the battery life of the battery 200. When the value of S/w1 is too small, the shrinkage area S of the multiple lithium supplement particles 400 during the lithium supplement process is too small or the mass fraction of the borate-based additive is too large. The lithium supplement particles 400 release insufficient lithium ions, making it difficult for the lithium supplement particles 400 to replenish the lithium ions lost during the charge-discharge cycles of the battery 200, which reduces the initial efficiency and the energy density of the battery 200. In addition, when the mass fraction of the borate-based additive is too large, a portion of the borate-based additive combines with the negative oxygen ions in the electrolyte 100, and the redundant borate-based additive may adhere to the interface between the positive electrode 230 and/or the negative electrode 210 and the electrolyte 100. In this case, reduction reaction occurs and decomposition products are generated, thereby increasing the interfacial impedance and slowing down the transmission speed and migration speed of active ions between the positive electrode 230/negative electrode 210 and the electrolyte 100, resulting in a low energy efficiency of the battery 200.

In some embodiments, the shrinkage area S of the multiple lithium supplement particles 400 during the lithium supplement process satisfies 0.1 $\mu m^2 \leq S \leq 6$ $\mu m^2$.

Specifically, the value of S may be, but is not limited to, 0.1 $\mu m^2$, 0.5 $\mu m^2$, 0.8 $\mu m^2$, 1 $\mu m^2$, 1.2 $\mu m^2$, 1.5 $\mu m^2$, 2 $\mu m^2$, 2.2 $\mu m^2$, 2.5 $\mu m^2$, 3 $\mu m^2$, 3.2 $\mu m^2$, 3.5 $\mu m^2$, 3.8 $\mu m^2$, 4 $\mu m^2$, 4.5 $\mu m^2$, 4.8 $\mu m^2$, 5 $\mu m^2$, 5.2 $\mu m^2$, 5.6 $\mu m^2$, 5.8 $\mu m^2$, 6 $\mu m^2$, etc.

In the embodiment, when the shrinkage area S of the multiple lithium supplement particles 400 during the lithium supplement process satisfies 0.1 $\mu m^2 \leq S \leq 6$ $\mu m^2$, the amount of lithium ions released by the multiple lithium supplement particles 400 is within a reasonable range. These lithium ions are replenished to the electrolyte 100, and are replenished to the negative electrode 210 through the electrolyte 100, so that the active ions lost during the charge-discharge cycles of the battery 200 are promptly replenished, thereby improving the initial efficiency, energy density, and capacity retention rate of the battery 200. When the shrinkage area S of the multiple lithium supplement particles 400 during the lithium supplement process is too large, the lithium supplement particles 400 release excessive lithium ions when the battery 200 is charged, resulting in lithium-plating on parts of the negative electrode 210, which increases the internal resistance of the battery 200 and reduces the energy efficiency of the battery 200. At the same time, the lithium supplement particles 400 release excessive negative oxygen ions and iron ions, and the negative oxygen ions and the iron ions combine to generate oxygen, leading to safety hazards and thus shortening the battery life of the battery 200. When the shrinkage area S of the multiple lithium supplement particles 400 during the lithium supplement process is too small, the lithium supplement particles 400 release insufficient lithium ions during the lithium supplement process, making it difficult for the lithium supplement particles 400 to replenish the active ions lost during the charge-discharge cycles of the battery 200, thereby reducing the initial efficiency and the energy density of the battery 200.

The following examples will further explain the technical solution of the disclosure.

Examples 1 to 9 and comparative examples 1 to 9 are described in the following.

1. Preparation of the Positive Electrode 230.

A positive active material (for example, lithium iron phosphate), lithium supplement particles 400 (for example, a particle with $Li_5FeO_4$ as the matrix 420 and $Al_2O_3@C$ as the coating layer 410, or a particle with $Li_6CoO_4$ as the matrix 420 and a carbon coating layer as the coating layer 410), a positive conductive agent (for example, conductive carbon black), and a positive binder (for example, polyvinylidene fluoride) are dispersed in a N-methylpyrrolidone (NMP) solvent and are well mixed to obtain a positive slurry. In the positive slurry, the mass fraction of the positive active material, the mass fraction of the positive conductive agent, and the mass fraction of the positive binder are at a ratio of 96%: 0.5%: 2.3%. The positive slurry is coated on the positive current collector layer 232 (for example, an aluminum foil) with a coating weight of 254 mg per unit area (1540.25 $mm^2$) to form the positive active layer 231. After drying, cold-pressing, slitting, and cutting, positive electrodes 230 of examples 1 to 9 and comparative examples 1 to 9 are obtained. Lithium supplement particles 400 of examples 1 to 8 and comparative examples 1 to 9 have $Li_5FeO_4$ as matrices 420 and $Al_2O_3@C$ as coating layers 410, and the lithium supplement particle 400 of example 9 has $Li_6CoO_4$ as the matrix 420 and a carbon coating layer as the coating layer 410. The values of the mass fraction w3 of the lithium supplement particles 400 of examples 1 to 9 and comparative examples 1 to 9, the plane shrinkage rate α of the matrix 420, and the shrinkage area S of the multiple lithium supplement particles 400 during the lithium supplement process are illustrated in table 1.

2. Preparation of the Negative Electrode 210 and the Separator 220.

A negative active material (for example, artificial graphite), a negative conductive agent (for example, carbon black), a negative thickener (for example, carboxymethyl cellulose), and a negative binder (for example, styrene butadiene rubber) are dispersed at a mass ratio of 96.5:0.5:1:2 in deionized water and are mixed homogeneously to obtain a negative slurry. The negative slurry is coated on a negative current collector layer (for example, a copper foil) with a coating weight of 122 mg per unit area (1540.25 mm$^2$). After drying, cold-pressing, slitting, and cutting, negative electrodes 210 of examples 1 to 9 and comparative examples 1 to 9 are obtained.

The separator 220 is a polyethylene separator with a thickness of 16 μm.

3. Preparation of the Electrolyte 100.

In a glove box under an argon atmosphere with a moisture content of ≤1 ppm, ethylene carbonate, dimethyl carbonate, and methyl ethyl carbonate at a mass ratio of 1:1:1 are mixed, and then a dried electrolyte lithium salt, i.e., a lithium hexafluorophosphate is dissolved in the solvent and is stirred until completely dissolved. The first additive and the second additive are added to the solvent and are mixed homogeneously to obtain the electrolyte 100. The concentration of the lithium salt is 1 mol/L. The values of the mass fraction w1 of the first additive and the mass fraction w2 of the second additive in the electrolyte 100 of examples 1 to 9 and comparative examples 1 to 9 are illustrated in table 1.

4. Assembly of the Battery 200.

The positive electrodes 230, the separators 220, and the negative electrodes 210 of examples 1 to 9 and comparative examples 1 to 9 are stacked in sequence. The separator 220 is positioned between the positive electrode 230 and the negative electrode 210, which are wound together to obtain a bare battery cell. The bare battery cell is placed in an outer package foil. After drying, the electrolyte 100 is injected, and example batteries 1 to 6 and comparative batteries 1 to 9 are obtained after processes such as standing, formation, packaging. The positive electrode 230 and the electrolyte 100 of example 1 are disposed in the example battery 1, the positive electrode 230 and the electrolyte 100 of example 2 are disposed in the example battery 2, and the positive electrode 230 and the electrolyte 100 of comparative example 1 are disposed in the comparative battery 1, and so on.

For the matrix 420 of the positive electrode 230, a testing method of the plane shrinkage rate α is as follows.

Figure 3:
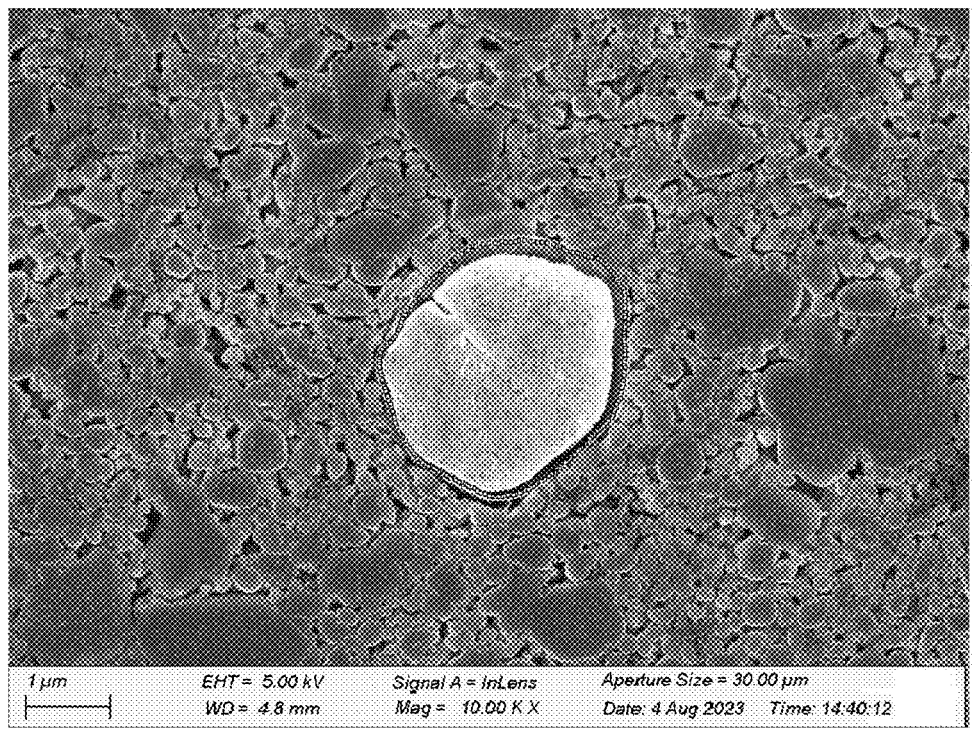
FIG. 3 is a scanning electron microscope (SEM) image of a lithium supplement particle after shrinkage provided in an embodiment of the disclosure.
Figure 4:
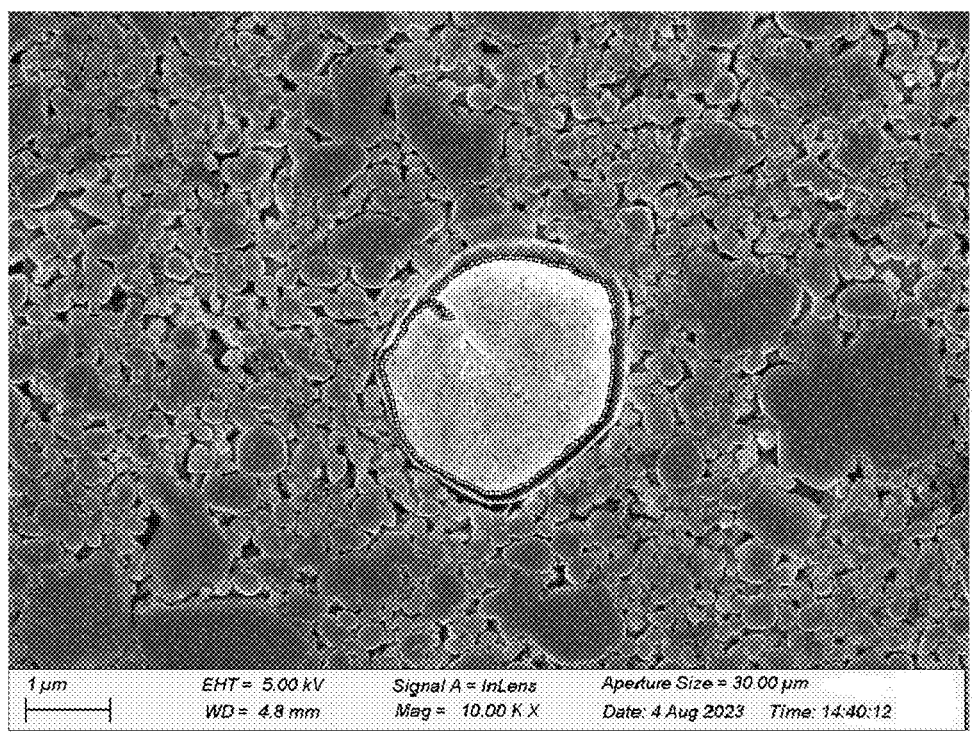
FIG. 4 is an SEM image of a lithium supplement particle after shrinkage provided in another embodiment of the disclosure.

Reference is made to FIG. 3 and FIG. 4. The positive electrode 230 is applied to the battery 200 and the battery 200 is charged. The positive electrode 230 is disassembled by cutting the positive electrode 230 with an ion-beam CP to obtain a cross-section of the positive electrode 230. The positive electrode 230 is observed by a scanning electron microscope (SEM) and a picture of the positive electrode 230 is captured at a magnification of 10K. FIG. 3 is an SEM image of a lithium supplement particle 400 after shrinkage provided in an embodiment of the disclosure. FIG. 3 shows a situation where points on the inner contour of the coating layer 410 are selected. An image analysis software is used and a polygon measurement function is adopted to select points along the inner contour of the coating layer 410. An area S1 defined by the inner contour of the coating layer 410 is calculated using the image analysis software, and the area defined by the inner contour of the coating layer 410 is the area of the matrix 420 before shrinkage. FIG. 4 is an SEM image of a lithium supplement particle 400 after shrinkage provided in another embodiment of the disclosure. FIG. 4 shows a situation where points on the outer contour of the matrix 420 are selected. Points are selected along the outer contour of the matrix 420. An area S2 defined by the outer contour of the matrix 420 is calculated using the image analysis software, which is the area of the matrix 420 after shrinkage. The plane shrinkage rate α of the matrix 420 satisfies α=(S1−S2)/S1×100%. By controlling the maximum charging voltage of the lithium-ion battery 200 during formation, the plane shrinkage rate α of the matrix 420 is controlled.

For the multiple matrices 420 of the positive electrode 230, a testing method of a shrinkage area S during the lithium supplement process is as follows.

The positive electrode 230 is applied to the battery 200 and the battery 200 is charged. The positive electrode 230 is disassembled by cutting the positive electrode 230 with an ion-beam CP to obtain a cross-section of the positive electrode 230. The positive electrode 230 is observed by a SEM and a picture of the positive electrode 230 is captured at a magnification of 5K. In a rectangular area of 22 μm×15 μm, a sum of areas defined by inner contours of the multiple coating layers 410 is S3, which is a sum of areas of the multiple lithium supplement particles 400 before shrinkage. A sum of areas defined by outer contours of the multiple matrices 420 is S4, which is a sum of areas of the multiple lithium supplement particles 400 after shrinkage. The shrinkage area S of the multiple matrices 420 during the lithium supplement process satisfies S=S3−S4.

Table 1 below shows the structural parameters of the electrolytes 100 and the batteries 200 of examples 1 to 9 and comparative examples 1 to 9.

TABLE 1 structural parameters of the electrolytes 100 and the batteries 200 of examples 1 to 9 and comparative examples 1 to 9

| Examples and comparative examples | Plane shrinkage rate α of the matrix (%) | Mass fraction w 3 of the prelithiation particles (%) | Shrinkage area S of the prelithiation particles during prelithiation (μm$^2$) | Mass fraction w 2 of the second additive(%) | Mass fraction w 1 of the first additive(%) | w 2/w 1 | w 3/w 1 | S/w 1 | α/w 1 |
|---|---|---|---|---|---|---|---|---|---|
| Example 1 | 15 | 2.5 | 1.5 | 2.00 | 0.30 | 6.67 | 1.25 | 5 | 50 |
| Example 2 | 15 | 2.5 | 1.5 | 3.00 | 0.50 | 6.00 | 0.75 | 3 | 30 |
| Example 3 | 15 | 2.5 | 1.5 | 2.20 | 0.30 | 7.33 | 1.25 | 5 | 50 |
| Example 4 | 22 | 2.5 | 2.5 | 2.00 | 0.50 | 4.00 | 1.10 | 5 | 44 |
| Example 5 | 22 | 2.5 | 2.5 | 3.00 | 0.80 | 3.75 | 0.69 | 3.13 | 27.5 |
| Example 6 | 36 | 2.5 | 4.2 | 3.50 | 1.20 | 2.92 | 0.75 | 3.50 | 30 |
| Example 7 | 22 | 1.0 | 1.2 | 2.00 | 0.50 | 4.00 | 0.44 | 2.40 | 44 |
| Example 8 | 22 | 3.8 | 3.1 | 2.00 | 0.50 | 4.00 | 1.67 | 6.20 | 44 |
| Example 9 | 22 | 2.5 | 2.5 | 2.00 | 0.50 | 4.00 | 1.10 | 3 | 44 |

TABLE 1-continued structural parameters of the electrolytes 100 and the batteries 200 of examples 1 to 9 and comparative examples 1 to 9

| Examples and comparative examples | Plane shrinkage rate α of the matrix (%) | Mass fraction w3 of the prelithiation particles (%) | Shrinkage area S of the prelithiation particles during prelithiation (μm²) | Mass fraction w2 of the second additive(%) | Mass fraction w1 of the first additive(%) | w 2/w 1 | α × w 3/w 1 | S/w 1 | α/w 1 |
|---|---|---|---|---|---|---|---|---|---|
| Comparative example 1 | 15 | 2.5 | 1.5 | 3.00 | 1.00 | 3.00 | 0.38 | 1.50 | 15 |
| Comparative example 2 | 22 | 2.5 | 2.5 | 3.00 | 0.30 | 10.00 | 1.83 | 8.33 | 73.33 |
| Comparative example 3 | 36 | 2.5 | 4.2 | 3.00 | 0.20 | 15.00 | 4.50 | 21 | 180 |
| Comparative example 4 | 22 | 2.5 | 2.5 | 0.50 | 0.30 | 1.67 | 1.83 | 8.33 | 73.33 |
| Comparative example 5 | 22 | 2.5 | 2.5 | 7.00 | 0.30 | 23.33 | 1.83 | 8.33 | 73.33 |
| Comparative example 6 | 22 | 2.5 | 2.5 | 3.00 | 0.005 | 600.00 | 110.00 | 500 | 4400 |
| Comparative example 7 | 22 | 2.5 | 2.5 | 3.00 | 3.00 | 1.00 | 0.18 | 0.83 | 7.33 |
| Comparative Example 8 | 2 | 2.5 | 0.3 | 3.00 | 0.30 | 10.00 | 0.17 | 1 | 6.67 |
| Comparative example 9 | 45 | 2.5 | 5.6 | 3.00 | 0.30 | 10.00 | 3.75 | 18.67 | 150 |

Performance test for the battery 200 is as follows.

Let example batteries 1 to 9 and comparative batteries 1 to 9 stand at 25° C. for 1 hour, and these batteries are charged to 3.65V at 0.5P and then discharged to 2.5V at 0.5P. An initial discharge capacity $C_1$ and an initial discharge energy $E_1$ of the battery 200 are recorded. The example batteries 1 to 9 and comparative batteries 1 to 9 are charged and discharged for 500 cycles. A discharge capacity $C_{500}$, charge capacity $C'_{500}$, discharge energy $E_{500}$, and charge energy $E'_{500}$ are recorded to obtain the energy efficiency $E=E_{500}/E'_{500}\times 100\%$ of the example batteries 1 to 9 and comparative batteries 1 to 9 after 500 cycles, and obtain a capacity retention rate $Cf=C_{500}/C_1\times 100\%$ of the example batteries 1 to 9 and comparative batteries 1 to 9 after 500 cycles. The energy efficiency E and capacity retention Cf of the example batteries 1 to 9 and comparative batteries 1 to 9 after 500 cycles are illustrated in table 2.

Table 2 below shows the performance parameters of example batteries 1 to 9 and comparative batteries 1 to 9.

TABLE 2 performance parameters of example batteries 1 to 9 and comparative batteries 1 to 9

| Example batteries and comparative batteries | Capacity retention rate Cf after 500 cycles (%) | Energy efficiency E after 500 cycles (%) |
|---|---|---|
| Example battery 1 | 97.00 | 94.60 |
| Example battery 2 | 97.30 | 94.28 |
| Example battery 3 | 97.28 | 94.45 |
| Example battery 4 | 98.65 | 94.26 |
| Example battery 5 | 98.70 | 93.80 |
| Example battery 6 | 98.90 | 93.40 |
| Example battery 7 | 97.39 | 94.86 |
| Example battery 8 | 98.95 | 92.89 |
| Example battery 9 | 97.98 | 94.56 |
| Comparative battery 1 | 97.28 | 93.80 |
| Comparative battery 2 | 95.36 | 93.60 |
| Comparative battery 3 | 94.84 | 93.33 |
| Comparative battery 4 | 95.30 | 95.30 |
| Comparative battery 5 | 94.20 | 86.20 |
| Comparative battery 6 | 93.40 | 88.43 |
| Comparative battery 7 | 93.67 | 86.63 |
| Comparative battery 8 | 93.16 | 89.98 |
| Comparative battery 9 | 92.10 | 88.60 |

Please refer to table 1 and table 2. As known from the data of examples 1 to 3 and comparative example 1, the values of the plane shrinkage rate α of the matrix 420, the shrinkage area S of the multiple lithium supplement particles 400 during the lithium supplement process, the mass fraction w2 of the second additive, the mass fraction w1 of the first additive, w2/w1, and S/w1 are all within a reasonable range. In examples 1 to 3, the values of α/w1 and S/w1 are also within a reasonable range. However, in comparative example 1, the value of α/w1 is less than 20, and the value of α×w3/w1 is less than 0.4, resulting in that the energy efficiency of the comparative battery 1 is lower than the energy efficiency of the example batteries 1 to 3. This is because in comparative example 1, the total lithium release amount of the matrix 420 is too small, or the mass fraction of the first additive is too large. When the total lithium release amount of the matrix 420 is too small, the mass fraction of the lithium supplement particles 400 is too small or the lithium ions released by the lithium supplement particles 400 are insufficient, making it difficult for the lithium supplement particles 400 to replenish the lithium ions lost during charge-discharge cycles. The lithium supplement particles 400 are less effective in replenishing lithium ions to the battery 200, which reduces the initial efficiency of the battery 200. When the mass fraction of the first additive is too large, the first additive can slow down side reactions between the electrolyte 100 and oxygen generated by the lithium supplement particles 400. However, products of redox reaction of the first additive include acid, and excessive acids may damage the interfacial film between the positive electrode 230 and/or the negative electrode 210 and the electrolyte 100. In this way, the stability of the interfacial film between the positive electrode 230 and/or the negative electrode 210 and the electrolyte 100 is reduced, and the internal resistance of the battery 200 is increased, thereby reducing the charge-discharge efficiency, the energy efficiency, and the safety performance of the battery 200 when the electrolyte 100 is applied to the battery 200.

As known from the data of example 4, comparative example 4, and comparative example 5, in example 4, comparative example 4, and comparative example 5, the values of the plane shrinkage rate α of the matrix 420, the mass fraction w1 of the first additive, and α/w1 are all within a reasonable range. In example 4, the mass fraction w2 of the second additive satisfies 1%≤w2≤4%, ensuring that w2/w1 is within a reasonable range. In comparative example 4, the mass fraction w2 of the second additive is less than 1%, resulting in the value of w2/w1 being too small. In comparative example 5, the mass fraction w2 of the second additive is greater than 4%, resulting in the value of w2/w1 being too large. As a result, the capacity retention rate of the example battery 4 after 500 cycles is higher than the capacity retention rate of the comparative batteries 4 and 5 after 500 cycles, and the energy efficiency of the example battery 4 after 500 cycles is higher than the energy efficiency of the comparative battery 5 after 500 cycles. This is because, in the example battery 4, both the mass fraction of the first additive and the mass fraction of the second additive are within a reasonable range. In this case, the first additive can produce enough decomposition products to cover the surfaces of the lithium supplement particles 400 and slow down the reaction between oxygen generated by the lithium supplement particles 400 and the electrolyte 100. In addition, excessive acids generated by the first additive due to excessive first additive are prevented, and the waste of the second additive caused by the consumption of the second additive due to insufficient first additive is also prevented. In this way, the interfacial film between the positive electrode 230 and/or the negative electrode 210 and the electrolyte 100 has a good stability, and the electrolyte 100 has a good stability, so that the example battery 4 has a high energy efficiency and capacity retention rate. In the comparative battery 4, the mass fraction of the first additive is much greater than the mass fraction of the second additive. The mass fraction of the second additive is too small, it is difficult for the second additive to facilitate the formation of the interfacial film between the positive electrode 230 and/or the negative electrode 210 and the electrolyte 100, and it is difficult to maintain the stability of the interfacial film between the positive electrode 230 and/or the negative electrode 210 and the electrolyte 100. In this case, the internal resistance of the battery 200 may be increased, thereby reducing the energy efficiency of the battery 200. In the comparative battery 5, the mass fraction of the first additive is much smaller than the mass fraction of the second additive. The mass fraction of the second additive is too large, when the battery 200 is charged, the first additive is more prone to oxidative decomposition and reductive decomposition. After the first additive is consumed, oxidative decomposition and reductive decomposition of some portions of the second additive occur to generate gas, resulting in a waste of the second additive. The gas generated by the second additive is not conducive to the cycling of the battery 200, which may accelerate side reactions between the positive electrode 230 and/or the negative electrode 210 and the electrolyte 100 and reduce the stability of the electrolyte 100. In this case, the internal resistance of the battery 200 is increased, which makes the capacity retention rate of the battery 200 to be relatively low.

As known from the data of example 4, example 7, and example 8, when other conditions are fixed, as the mass fraction w3 of the lithium supplement particles 400 increases, the values of α×w3/w1 increases, and the shrinkage area S of the multiple lithium supplement particles 400 during the lithium supplement process and the value of S/w1 also increase, so that the capacity retention rates of the example battery 7, example battery 4, and example battery 8 after 500 cycles gradually increase and the energy efficiencies of the example battery 7, example battery 4, and example battery 8 gradually decrease. This is because, a greater mass fraction of the lithium supplement particles 400 corresponds to a greater shrinkage area S of the multiple lithium supplement particles 400 during the lithium supplement process, and corresponds to a greater value of α×w3/w1 and S/w1, which means a greater total lithium release amount. When the battery 200 is charged, the lithium supplement particles 400 can release lithium ions promptly to replenish the lithium ions lost during the charge-discharge cycles, so that the battery 200 has a high initial efficiency. However, as the lithium release amount increases, more oxygen released by the lithium supplement particles 400, leading to lithium-plating on parts of the negative electrode 210, and an increase of side reactions between oxygen and the electrolyte 100, which increases the internal resistance of the battery 200, and thus reduces the energy efficiency of the battery 200.

As known from the data of example 4 and example 9, the electrolytes 100 and the batteries 200 of example 4 and example 9 have the same structure parameters, but the materials of the lithium supplement particles 400 of example 4 and example 9 are different. In example 4, the lithium supplement particles 400 have $Li_5FeO_4$ as matrices 420 and $Al_2O_3$@C as coating layers 410. In example 9, the lithium supplement particles 400 have $Li_6CoO_4$ as matrices 420, and coating layers 410 of the lithium supplement particles 400 are carbon coating layers. As known from the data in table 2, the example battery 4 and the example battery 9 both have a high energy efficiency and capacity retention rate after 500 cycles. When the lithium supplement particles 400 are applied to the battery 200, a good lithium supplement effect is achieved, and the borate-based additive can cooperate with lithium supplement particles 400 formed by different material to maintain the cycling performance of the battery 200.

As known from the data of example 5, comparative example 6, and comparative example 7, in example 5, comparative example 6, and comparative example 7, the values of the plane shrinkage rate α of the matrix 420, the mass fraction w2 of the second additive, and the shrinkage area S of the multiple lithium supplement particles 400 during the lithium supplement process are the same. In example 5, the mass fraction w1 of the first additive satisfies 0.01%≤w1≤2%, ensuring that the values of w2/w1, α/w1, α×w3/w1, and S/w1 are within a reasonable range. In comparative example 6, the mass fraction w1 of the first additive is less than 0.1%, resulting in the values of w2/w1, α/w1, α×w3/w1, and S/w1 being too large. In comparative example 7, the mass fraction w1 of the first additive is greater than 2%, resulting in the values of w2/w1, α/w1, α×w3/w1, and S/w1 being too small. As a result, the capacity retention rate of the example battery 5 after 500 cycles is higher than the capacity retention rate of the comparative batteries 6 and 7 after 500 cycles, and the energy efficiency of the example battery 5 after 500 cycles is higher than the energy efficiency of the comparative batteries 6 and 7 after 500 cycles. This is because in the example battery 5, the plane shrinkage rate α of the matrix 420, the mass fraction w1 of the first additive, and the mass fraction w2 of the second additive are all within a reasonable range and mutually constrained. The lithium supplement particles 400 release not too much oxygen while releasing lithium ions. The products generated by oxidative decomposition and reductive decomposition of the first additive can effectively block side reactions between the electrolyte 100 and oxygen, and the acid generated by the first additive is not too much, which can also prevent the second additive from oxidative decomposition, so that the second additive can maintain the interfacial stability between the positive electrode 230 and/or the negative electrode 210 and the electrolyte 100, thereby enabling the example battery 5 has both high capacity retention rate and energy efficiency. In comparative battery 6, the mass fraction w1 of the first additive is too small, resulting in the values of w2/w1, α/w1 being too large. On one hand, when the shrinkage rate of the matrix 420 is too large and the mass fraction of the first additive is too small, the lithium ions released by the lithium supplement particles 400 will be excessive, which may lead to lithium-plating on parts of the negative electrode 210. In addition, when the lithium supplement particles 400 release lithium ions, excessive oxygen is released, and the products of oxidative decomposition and reductive decomposition of the first additive are insufficient to prevent side reactions between oxygen released by the lithium ions and the electrolyte 100. Therefore, the stability of the electrolyte 100 is poor, resulting in a lower capacity retention rate of the comparative battery 6. On the other hand, the mass fraction of the second additive is greater than the mass fraction of the first additive. When the battery 200 is charged, the first additive is more prone to oxidative decomposition and reductive decomposition. After the first additive is consumed, oxidative decomposition and reductive decomposition of some portions of the second additive occur to generate gas, resulting in a waste of the second additive. The gas generated by the second additive is not conducive to the cycling of the battery 200, which may accelerate side reactions between the positive electrode 230 and/or the negative electrode 210 and the electrolyte 100 and reduce the stability of the electrolyte 100. In this case, the internal resistance of the battery 200 is increased, which makes the capacity retention rate of the comparative battery 6 to be relatively low. Furthermore, in the comparative battery 7, the mass fraction w1 of the first additive is too large, resulting in the values of w2/w1, α/w1 being too small. The first additive is more prone to oxidative decomposition and reductive decomposition compared to the second additive, and the generated products can slow down side reactions between the electrolyte 100 and oxygen. However, excessive acids generated by the first additive may damage the interfacial film between the positive electrode 230 and/or the negative electrode 210 and the electrolyte 100. In this way, the stability of the interfacial film between the positive electrode 230 and/or the negative electrode 210 and the electrolyte 100 is reduced, and the internal resistance of the battery 200 is increased, thereby reducing the capacity retention rate and the energy retention rate of the comparative battery 7.

As known from the data of example 6 and comparative example 3, in example 6 and comparative example 3, the values of the plane shrinkage rate α of the matrix 420 and the shrinkage area S of the multiple lithium supplement particles 400 during the lithium supplement process are the same. In addition, in example 6, the mass fraction w1 of the first additive satisfies 0.01%≤w1≤2% and the mass fraction w2 of the second additive satisfies 1%≤w2≤4%, ensuring that the values of w2/w1, α/w1, α×w3/w1, and S/w1 are within a reasonable range. In comparative example 3, the mass fraction w1 of the first additive satisfies 0.01%≤w1≤2% and the mass fraction w2 of the second additive satisfies 1%≤w2≤4%, but the value of w2/w1 is too large, and the values of α/w1 and α×w3/w1 are also too large. As a result, the capacity retention rate of the example battery 6 after 500 cycles is higher than the capacity retention rate of the comparative battery 3 after 500 cycles, and the energy efficiency of the example battery 6 after 500 cycles is higher than the energy efficiency of the comparative battery 3 after 500 cycles. This is because in the example battery 6, the plane shrinkage rate α of the matrix 420, the mass fraction w1 of the first additive, and the mass fraction w2 of the second additive are all within a reasonable range and mutually constrained. The lithium supplement particles 400 release not too much oxygen while releasing lithium ions. The products generated by oxidative decomposition and reductive decomposition of the first additive can effectively block side reactions between the electrolyte 100 and oxygen, and the acid generated by the first additive is not too much, which can also prevent the second additive from oxidative decomposition, so that the second additive can maintain the interfacial stability between the positive electrode 230 and/or the negative electrode 210 and the electrolyte 100, thereby enabling the example battery 6 has both high capacity retention rate and energy efficiency. In comparative battery 3, the values of w2/w1, α/w1, and α×w3/w1 are too large. On one hand, when the shrinkage rate of the matrix 420 is too large and the mass fraction of the first additive is too small, the lithium ions released by the lithium supplement particles 400 will be excessive, which may lead to lithium-plating on parts of the negative electrode 210. In addition, when the lithium supplement particles 400 release lithium ions, excessive oxygen is released, and the products of oxidative decomposition and reductive decomposition of the first additive are insufficient to prevent side reactions between oxygen released by the lithium ions and the electrolyte 100. Therefore, the stability of the electrolyte 100 is poor, resulting in a lower capacity retention rate of the comparative battery 3. On the other hand, the mass fraction of the second additive is greater than the mass fraction of the first additive. When the battery 200 is charged, the first additive is more prone to oxidative decomposition and reductive decomposition. After the first additive is consumed, oxidative decomposition and reductive decomposition of some portions of the second additive occur to generate gas, resulting in a waste of the second additive. The gas generated by the second additive is not conducive to the cycling of the battery 200, which may accelerate side reactions between the positive electrode 230 and/or the negative electrode 210 and the electrolyte 100 and reduce the stability of the electrolyte 100. In this case, the internal resistance of the battery 200 is increased, which makes the capacity retention rate of the comparative battery 3 to be relatively low.

As known from the data of comparative example 2, comparative example 8, and comparative example 9, when the values of the mass fraction w2 of the second additive, the mass fraction w1 of the first additive, and w2/w1 are the same, the values of the shrinkage area S of the multiple lithium supplement particles 400 during the lithium supplement process, α/w1, and S/w1 increase as the plane shrinkage rate α of the matrix 420 increases. In comparaexample 2, the plane shrinkage rate α of the matrix 420 satisfies 5%≤α≤40%. In comparative example 8, the plane shrinkage rate α of the matrix 420 is less than 5%. In comparative example 9, the plane shrinkage rate α of the matrix 420 is greater than 40%. As a result, the capacity retention rate of the comparative battery 2 after 500 cycles is higher than the capacity retention rate of the comparative batteries 8 and 9 after 500 cycles, and the energy efficiency of the comparative battery 2 after 500 cycles is higher than the energy efficiency of the comparative batteries 8 and 9 after 500 cycles. This is because in comparative example 8, the plane shrinkage rate α of the matrix 420 is too small, when the battery 200 is charged, the lithium supplement particles 400 release insufficient lithium ions, making it difficult for the lithium supplement particles 400 to replenish the lithium ions lost during the charge-discharge cycles of the battery 200. In this case, active ions in the battery 200 are insufficient, so that the capacity retention rate and the energy efficiency of the comparative battery 8 are low. In the comparative example 9, the plane shrinkage rate α of the matrix 420 is too large, when the battery 200 is charged, the lithium supplement particles 400 release excessive lithium ions, which may easily result in lithium-plating on parts of the negative electrode 210. Correspondingly, oxygen released by the lithium supplement particles 400 is excessive, which increases the chance of side reactions between the electrolyte 100 and oxygen, thereby reducing the stability of the electrolyte 100. In addition, the products of side reactions between the electrolyte 100 and oxygen may increase the internal resistance of the battery 200, so that the comparative battery 9 has a low capacity retention rate and energy efficiency.

Figure 5:
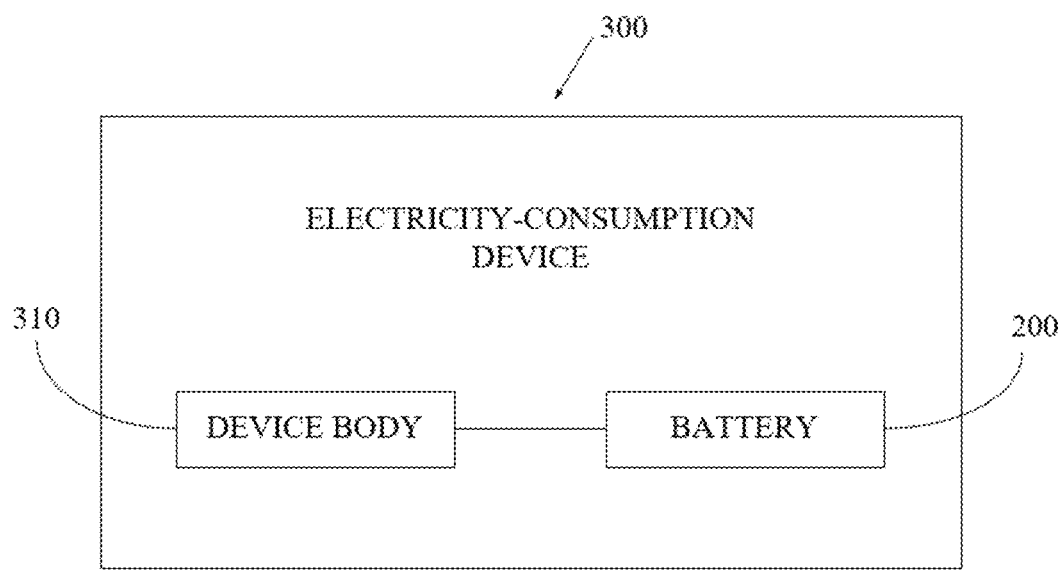
FIG. 5 is a circuit diagram of an electricity-consumption device provided in an embodiment of the disclosure.
Figure 6:
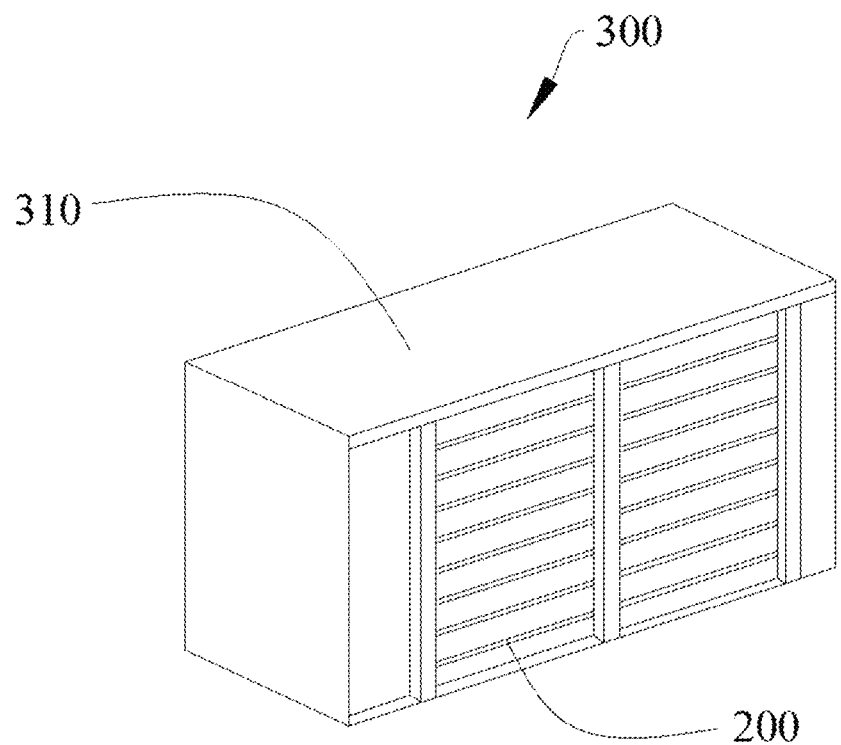
FIG. 6 is a schematic structural view of an electricity-consumption device provided in an embodiment of the disclosure.

Reference is made to FIG. 5 and FIG. 6. This embodiment also provides an electricity-consumption device 300, which includes: a device body 310 and the battery 200 provided in the disclosure. The battery 200 supplies power to the device body 310.

It may be understood that the battery 200 is electrically connected to the device body 310.

In this embodiment, the battery 200 has a good initial efficiency, cycle performance, and safety performance, resulting in a long battery life of the battery 200. When the battery 200 is used to power the device body 310, the battery 200 can provide a stable power supply to the device body 310, ensuring the normal operation of the device body 310.

Optionally, the electricity-consumption device 300 in embodiments of the disclosure may be, but is not limited to, a cell phone, a tablet computer, a laptop, a desktop computer, a smart bracelet, a smart watch, an e-reader, a game console, and other portable electronic devices. It may also be an automobile, a truck, a sedan, a van, a freight car, a train, a high-speed train, an electric automatic vehicle, and other transportation tools. In addition, it may be various household appliances. In the disclosure, the electricity-consumption device 300 in the embodiment of FIG. 6 is an energy storage battery cabinet.

It may be understood that, the electricity-consumption device 300 is merely a form of the electricity-consumption device 300 to which the battery 200 is applied, and should not be understood as limitation to the electricity-consumption device 300 provided in the disclosure, nor should be understood as limitation to the electricity-consumption device 300 provided in various embodiments of the disclosure.

Reference terms "embodiment" and "implementation" referred to herein mean that particular features, structures, or characteristics described in conjunction with embodiments may be contained in at least one embodiment of the disclosure. The phrase appearing in various places in the specification does not necessarily refer to the same embodiment, a separate embodiment that is mutually exclusive with other embodiments, or an alternative embodiment. It is both explicitly and implicitly understood by those of ordinary skill in the art that the embodiments described in the specification may be combined with other embodiments. In addition, it may also be understood that the features, structures, or characteristics described in embodiments of the disclosure, without contradicting each other, can be combined at will to form yet another embodiment that does not depart from the spirit and scope of the technical solution of the disclosure.

Finally, it should be noted that the above embodiments are used only to illustrate the technical solutions of the disclosure and not to limit it. Although the disclosure is described in detail with reference to the above optimal embodiments, it should be understood by those of ordinary skill in the art that modifications or equivalent substitutions can be made to the technical solutions of the disclosure without departing from the spirit and scope of the technical solutions of the disclosure.

What is claimed is:

1. A battery, comprising:
a negative electrode;
a separator, disposed on one side of the negative electrode;
a positive electrode, disposed on one side of the separator facing away from the negative electrode, wherein the positive electrode comprises a positive active layer and a positive current collector layer, the positive active layer is disposed on a surface of the positive current collector layer, and the positive active layer comprises a plurality of lithium supplement particles; and
an electrolyte, wherein at least part of the positive electrode and at least part of the negative electrode are immersed in the electrolyte, and the electrolyte comprises a first additive and a lithium salt, wherein a structural formula of the first additive is

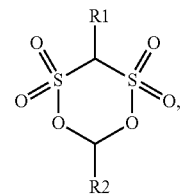

wherein R1 is selected from a group consisting of H, $C_nH_{2n+1}$, and $C_6H_5$, and R2 is selected from a group consisting of H, $C_nH_{2n+1}$, and $C_6H_5$, with n satisfying $1 \leq n \leq 10$; and a mass fraction w1 of the first additive in the electrolyte satisfies $0.01\% \leq w1 \leq 2\%$;

wherein a mass fraction of the lithium supplement particles in the positive active layer is w3, the lithium supplement particle comprises a matrix and a coating layer, the coating layer is disposed on an outer surface of the matrix, a plane shrinkage rate α of the matrix satisfies $0.4 \leq \alpha \times w3/w1 \leq 1.7$; wherein a chemical formula of the matrix is $Li_{1+r}M_{1-p}N_pO_{4-s}B_s$, with r satisfying $0.1 < r < 6.1$, p satisfying $0 \leq p < 0.99$, and s satisfying $0 \leq s < 0.1$; wherein M and N each are selected from a group consisting of iron, cobalt, nickel, titanium, zinc, magnesium, aluminum, manganese, vanadium, chromium, zirconium, copper, niobium, tantalum, tungsten, yttrium, lanthanum, and any combination thereof, and B is selected from a group consisting of sulfur, nitrogen, fluorine, chlorine, bromine, and any combination thereof.

2. The battery of claim 1, wherein an area defined by an inner contour of the coating layer in a cross-section of the positive electrode is S1, and after the lithium supplement particles release lithium ions, an area defined by an outer contour of the matrix is S2, wherein the plane shrinkage rate $\alpha$ of the matrix satisfies $\alpha=(S1-S2)/S1\times100\%$, and the battery satisfies $20\leq\alpha/w1\leq60$.

3. The battery of claim 2, wherein the plane shrinkage rate $\alpha$ of the matrix satisfies $5\%\leq\alpha\leq40\%$.

4. The battery of claim 1, wherein the mass fraction w3 of the lithium supplement particles in the positive active layer satisfies $0.5\%\leq w3\leq5\%$.

5. The battery of claim 1, wherein a plurality of lithium supplement particles are in a cross-section of the positive electrode under a 5K magnification and within a rectangular area of 22 μm×15 μm; a sum of areas defined by inner contours of a plurality of coating layers is S3, and after the lithium supplement particles release lithium ions, a sum of areas defined by outer contours of a plurality of matrices is S4, wherein a shrinkage area S of the plurality of lithium supplement particles during a lithium supplement process satisfies S=S3−S4, and S satisfies $1.5\ \mu m^2\leq S/w1\leq8\ \mu m^2$.

6. The battery of claim 5, wherein the shrinkage area S of the plurality of lithium supplement particles during the lithium supplement process satisfies $0.1\ \mu m^2\leq S\leq6\ \mu m^2$.

7. The battery of claim 1, wherein the electrolyte further comprises a second additive, wherein the second additive is a film-forming additive, a reduction potential of the first additive is higher than a reduction potential of the second additive, an oxidation potential of the first additive is lower than an oxidation potential of the second additive, and a mass fraction w2 of the second additive in the electrolyte satisfies $2\leq w2/w1\leq10$.

8. The battery of claim 7, wherein the mass fraction w2 of the second additive in the electrolyte satisfies $1\%\leq w2\leq4\%$.

9. The battery of claim 7, wherein the second additive is selected from a group consisting of vinylene carbonate, fluoroethylene carbonate, ethylene sulfate, tris(trimethylsilane)phosphate, 1,3-propanesultone, adiponitrile, butanedinitrile, 1,3,6-hexanetricarbonitrile, and any combination thereof.

10. An electricity-consumption device, comprising:
a device body; and
a battery, wherein the battery is configured to supply power to the device body; and the battery comprises:
a negative electrode;
a separator, disposed on one side of the negative electrode;
a positive electrode, disposed on one side of the separator facing away from the negative electrode, wherein the positive electrode comprises a positive active layer and a positive current collector layer, the positive active layer is disposed on a surface of the positive current collector layer, and the positive active layer comprises a plurality of lithium supplement particles; and
an electrolyte, wherein at least part of the positive electrode and at least part of the negative electrode are immersed in the electrolyte, and the electrolyte comprises a first additive and a lithium salt, wherein a structural formula of the first additive is

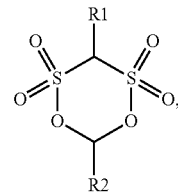

wherein R1 is selected from a group consisting of H, $C_nH_{2n+1}$, and $C_6H_5$, and R2 is selected from a group consisting of H, $C_nH_{2n+1}$, and $C_6H_5$, with n satisfying $1\leq n\leq10$; and a mass fraction w1 of the first additive in the electrolyte satisfies $0.01\%\leq w1\leq2\%$;

wherein a mass fraction of the lithium supplement particles in the positive active layer is w3, the lithium supplement particle comprises a matrix and a coating layer, the coating layer is disposed on an outer surface of the matrix, a plane shrinkage rate $\alpha$ of the matrix satisfies $0.4\leq\alpha\times w3/w1\leq1.7$; wherein a chemical formula of the matrix is $Li_{1+r}M_{1-p}N_pO_{4-s}B_s$, with r satisfying $0.1<r<6.1$, p satisfying $0\leq p<0.99$, and s satisfying $0\leq s<0.1$; wherein M and N each are selected from a group consisting of iron, cobalt, nickel, titanium, zinc, magnesium, aluminum, manganese, vanadium, chromium, zirconium, copper, niobium, tantalum, tungsten, yttrium, lanthanum, and any combination thereof, and B is selected from a group consisting of sulfur, nitrogen, fluorine, chlorine, bromine, and any combination thereof.

11. The electricity-consumption device of claim 10, wherein an area defined by an inner contour of the coating layer in a cross-section of the positive electrode is S1, and after the lithium supplement particles release lithium ions, an area defined by an outer contour of the matrix is S2, wherein the plane shrinkage rate $\alpha$ of the matrix satisfies $\alpha=(S1-S2)/S1\times100\%$, and the battery satisfies $20\leq\alpha/w1\leq60$.

12. The electricity-consumption device of claim 11, wherein the plane shrinkage rate $\alpha$ of the matrix satisfies $5\%\leq\alpha\leq40\%$.

13. The electricity-consumption device of claim 10, wherein the mass fraction w3 of the lithium supplement particles in the positive active layer satisfies $0.5\%\leq w3\leq5\%$.

14. The electricity-consumption device of claim 10, wherein a plurality of lithium supplement particles are in a cross-section of the positive electrode under a 5K magnification and within a rectangular area of 22 μm×15 μm; a sum of areas defined by inner contours of a plurality of coating layers is S3, and after the lithium supplement particles release lithium ions, a sum of areas defined by outer contours of a plurality of matrices is S4, wherein a shrinkage area S of the plurality of lithium supplement particles during a lithium supplement process satisfies S=S3−S4, and S satisfies $1.5\ \mu m^2\leq S/w1\leq8\ \mu m^2$.

15. The electricity-consumption device of claim 14, wherein the shrinkage area S of the plurality of lithium supplement particles during the lithium supplement process satisfies $0.1\ \mu m^2\leq S\leq6\ \mu m^2$.

16. The electricity-consumption device of claim 10, wherein the electrolyte further comprises a second additive, wherein the second additive is a film-forming additive, a reduction potential of the first additive is higher than a reduction potential of the second additive, an oxidation potential of the first additive is lower than an oxidation potential of the second additive, and a mass fraction w2 of the second additive in the electrolyte satisfies 2≤w2/w1≤10.

17. The electricity-consumption device of claim 16, wherein the mass fraction w2 of the second additive in the electrolyte satisfies 1%≤w2≤4%.

18. The electricity-consumption device of claim 16, wherein the second additive is selected from a group consisting of vinylene carbonate, fluoroethylene carbonate, ethylene sulfate, tris(trimethylsilane)phosphate, 1,3-propanesultone, adiponitrile, butanedinitrile, 1,3,6-hexanetricarbonitrile, and any combination thereof.

* * * * *